(12) United States Patent
Gao et al.

(10) Patent No.: US 11,634,603 B2
(45) Date of Patent: Apr. 25, 2023

(54) IONIC CONDUCTIVE INK AND STRETCHABLE TOUCH SENSORS OR PANELS BASED ON THE IONIC CONDUCTIVE INK

(71) Applicant: NANYANG TECHNOLOGICAL UNIVERSITY, Singapore (SG)

(72) Inventors: Dace Gao, Singapore (SG); Jiangxin Wang, Singapore (SG); Pooi See Lee, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 17/263,964

(22) PCT Filed: Jul. 30, 2019

(86) PCT No.: PCT/SG2019/050380
§ 371 (c)(1),
(2) Date: Jan. 28, 2021

(87) PCT Pub. No.: WO2020/027734
PCT Pub. Date: Feb. 6, 2020

(65) Prior Publication Data
US 2021/0309877 A1 Oct. 7, 2021

(30) Foreign Application Priority Data
Jul. 30, 2018 (SG) .......................... 10201806483Y

(51) Int. Cl.
| | | |
|---|---|---|
| *B41J 2/17* | (2006.01) | |
| *B41J 2/01* | (2006.01) | |
| *C08F 2/46* | (2006.01) | |
| *C08F 2/50* | (2006.01) | |
| *C08G 61/04* | (2006.01) | |
| *C09D 11/52* | (2014.01) | |
| *G06F 3/044* | (2006.01) | |
| *C09D 11/033* | (2014.01) | |
| *C09D 11/106* | (2014.01) | |
| *C09D 11/107* | (2014.01) | |
| *C09D 11/38* | (2014.01) | |

(52) U.S. Cl.
CPC ............ *C09D 11/52* (2013.01); *C09D 11/033* (2013.01); *C09D 11/106* (2013.01); *C09D 11/107* (2013.01); *C09D 11/38* (2013.01); *G06F 3/0443* (2019.05); *G06F 3/0446* (2019.05); *G06F 2203/04102* (2013.01); *G06F 2203/04103* (2013.01); *G06F 2203/04111* (2013.01)

(58) Field of Classification Search
CPC ....... C09D 11/10; C09D 11/107; C09D 11/52; C09D 11/38; C09D 11/106; C09D 11/033; G06F 3/0443; G06F 3/0446; G06F 2203/04102; G06F 2203/04111; G06F 2203/04103
USPC ......... 347/95, 84, 1; 522/6, 189, 184, 71, 1; 520/1
See application file for complete search history.

(56) References Cited

U.S. PATENT DOCUMENTS

| | | | |
|---|---|---|---|
| 2013/0050363 A1* | 2/2013 | Usui | ................... C09D 11/102 347/100 |
| 2013/0155011 A1 | 6/2013 | Kim et al. | |
| 2017/0137650 A1* | 5/2017 | Liu | ...................... C09D 125/14 |
| 2017/0329434 A1 | 11/2017 | Naito et al. | |

FOREIGN PATENT DOCUMENTS

| | | | | |
|---|---|---|---|---|
| CN | 107636085 | * | 1/2018 | |
| EP | 0685810 A1 | | 12/1995 | |
| JP | 1997012942 | * | 1/1997 | |
| JP | H09-012942 A | | 1/1997 | |
| WO | WO 2011/012225 A1 | | 2/2011 | |
| WO | WO-2015158649 A1 | * | 10/2015 | ............. B01J 13/06 |
| WO | WO-2017013398 A1 | * | 1/2017 | ............. B01D 61/44 |

OTHER PUBLICATIONS

Fujiwara et al, JP 1997-012942 Machine Translation, Jan. 14, 1997 (Year: 1997).*
Loccufier et al, CN 107636085 Machine Translation, Jan. 26, 2018 (Year: 2018).*
G. Walker, *A review of technologies for sensing contact location on the surface of a display*, Journal of the Society for Information Display 2012, 20, 413.
G. Barrett et al, *Projected-Capacitive Touch Technology*, Information Display Mar. 2010, pp. 16-21.

(Continued)

*Primary Examiner* — Jessica Whiteley
(74) *Attorney, Agent, or Firm* — Alston & Bird LLP

(57) ABSTRACT

An inkjet printable ionic conductive ink for producing a touch sensor device is provided. The inkjet printable ionic conductive ink includes a hydrophilic polymer and an ionic salt, a mixture of solvents in which the hydrophilic polymer and the ionic salt are dissolved therein to form a solution, and a surfactant to render the solution inkjet printable. A method of producing the inkjet printable ionic conductive ink is also provided. The method includes dissolving a hydrophilic polymer and an ionic salt in a mixture of solvents to form a solution, and mixing the solution with a surfactant to render the solution inkjet printable. A touch sensor panel comprising the ionic conductive ink and a method of producing the touch sensor panel are also provided.

20 Claims, 14 Drawing Sheets

(56) References Cited

OTHER PUBLICATIONS

M. Sasaki et al., *Highly Conductive Stretchable and Biocompatible Electrode-Hydrogel Hybrids for Advanced Tissue Engineering*, Advanced Healthcare Materials 2014, 3, 1919-1927.

S. Ma et al, *Fabrication of Novel Transparent Touch Sensing Device via Drop-on-Demand Inkjet Printing Technique*, ACS Applied Materials & Interfaces 2015, 7, 21628.

D. J. Lipomi et al., *Skin-like pressure and strain sensors based on transparent elastic films of carbon nanotubes*, Nat Nanotechnol Oct. 23, 2011, vol. 6, pp. 788-792.

J. Mu et al., *An Elastic Transparent Conductor Based on Hierarchically Wrinkled Reduced Graphene Oxide for Artificial Muscles and Sensors*, Adv Mater 2016, 28, pp. 9491-9497.

M. Kang et al., *Graphene-Based Three Dimensional Capacitive Touch Sensor for Wearable Electronics*, ACS Nano Jul. 2017, 11, pp. 7950-7957.

T. Y. Choi et al., *Stretchable, Transparent, and Stretch-Unresponsive Capacitive Touch Senor Array with Selectively Patterned Silver Nanowires/Reduced Graphene Oxide Electrodes*, ACS Applied Materials & Interfaces, Pub May 9, 2017, 9, pp. 18022-18030.

W. Hu et al., *Elastomeric transparent capacitive sensors based on an interpenetrating composite of silver nanowires and polyurethane*, Applied Physics Letters Pub online Feb. 28, 2013, 102, 083303 (6 pages).

S. Yao et al., *Wearable multifunctional sensors using printed stretchable conductors made of silver nanowires*, , Nanoscale 2014, 6, 2345-2352.

D. S. Hecht et al., *Emerging Transparent Electrodes Based on Thin Films of Carbon Nanotubes, Graphene, and Metallic Nanostructures*, Advanced Materials Published online: Feb. 15, 2011, 23, 1482-1513.

M. S. Sarwar et al., *Bend, stretch, and touch: Locating a finger on an actively deformed transparent sensor array*, Sci Adv Mar. 15, 2017, 3, e1602200 (9 pages).

C. Keplinger et al., *Stretchable, Transparent, Ionic Conductors*, Science Aug. 30, 2013, vol. 341, 984-987.

J. Wang et al., *Extremely Stretchable Electroluminescent Devices with Ionic Conductors*, Adv Mater 2016, 28, 4490-4496, Published online: Dec. 4, 2015.

C. Larson et al., *Highly stretchable electroluminescent skin for optical signaling and tactile sensing*, Science Mar. 4, 2016, vol. 351, 1071-1074.

J. Y. Sun et al., *Ionic Skin*, Adv Mater 2014, 26, 7608-7614, Published online: Oct. 29, 2014.

C. C. Kim et al., *Highly stretchable, transparent ionic touch panel*, Science Aug. 12, 2016, vol. 353, 682-687.

J. Li et al., *Inkjet printing for biosensor fabrication: combining chemistry and technology for advanced manufacturing*, Lab Chip 2013, 15, 2538.

E. Tekin et al., *Inkjet printing as a deposition and patterning tool for polymers and inorganic particles*, , Soft Matter Feb. 26, 2008, 4, 703-713.

B. Derby, *Inkjet Printing of Functional and Structural Materials: Fluid Property Requirements, Feature Stability, and Resolution*, , Annual Review of Materials Research Mar. 9, 2010, 40, 395-414.

E. Otsuka et al., *A Simple Method to Obtain a Swollen PVA Gel Crosslinked by Hydrogen Bonds*, Journal of Applied Polymer Science May 27, 2009, vol. 114, pp. 10-16.

H. Takeshita et al., *Gelation Process and Phase Separation of PVA Solutions as Studied by a Light Scattering Technique*, Macromolecules Published on Web Oct. 20, 1999, 32, pp. 7815-7819.

S. Lim et al., *Inkjet-Printed Reduced Graphene Oxide/Poly(Vinyl Alcohol) Composite Electrodes for Flexible Transparent Organic Field-Effect Transistors*, The Journal of Physical Chemistiy C Mar. 8, 2012, 116, 7520-7525.

J. Lee et al., *An Analysis of Electrode Patterns in Capacitive Touch Screen Panels*, Journal of Display Technology May 2014, 10, 362-366.

F. Xu et al., *Highly Conductive and Stretchable Silver Nanowire Conductors*, Adv Mater Published online: Jul. 12, 2012, 24, 5117-5122.

L. Cai et al., *Super-stretchable, Transparent Carbon Nanotube-Based Capacitive Strain Sensors for Human Motion Detection*, Sci Rep Pub. Oct. 25, 2013, 3, 3048.

A. Salim et al., *Review of Recent Inkjet-Printed Capacitive Tactile Sensors*, Sensors, Nov. 10, 2017, vol. 17, No. 11, pp. 2593: 1-20.

\* cited by examiner

IONIC CONDUCTIVE INK AND STRETCHABLE TOUCH SENSORS OR PANELS BASED ON THE IONIC CONDUCTIVE INK

CROSS-REFERENCE TO RELATED APPLICATIONS

This application is a national phase entry of PCT/SG2019/050380, filed on 30 Jul. 2019, which claims the benefit of priority of Singapore Patent Application No. 10201806483Y, filed 30 Jul. 2018, the contents of which are hereby incorporated by reference in their entirety for all purposes.

TECHNICAL FIELD

The present disclosure relates to an ionic conductive ink for use in touch sensor panels. The present disclosure also relates to a method of producing the ionic conductive ink.

BACKGROUND

The development and maturing of touch sensing technology has enabled simple and intuitive real-time human-machine interaction and communication. Just as human's skin may perceive tactile feeling, state-of-the-art touch sensors may be built to detect every single, multi-point or gestural touch input and transfer these signals to a controller for post-processing.

Among existing touch sensing mechanisms, projected capacitive (p-cap) touch technology may be superior over others in terms of unlimited multi-touch functionality, optical transmittance and efficiency in signal controlling ability, thus dominating today's consumer electronic market. A general p-cap touch sensor may consist of individual conductive electrodes arranged separately in perpendicular directions (along x and y axes in different planes), and capacitors are formed at each intersection. An object, which is grounded but conductive (e.g. a human finger), approaching the electrodes tends to disturb fringing electric field and weaken charge coupling between x and y electrodes. In other words, the capacitor's mutual capacitance ($C_m$) gets reduced. The $C_m$ values at all x-y intersections are constantly measured, and location of touch inputs are estimated from measured $C_m$ that decreases at specific positions.

Considering the success of p-cap touch sensors achieved based on indium tin oxide (ITO) rigid transparent electronics, research interest in "skin like" touch sensors developed. Recently, conductive polymers, carbon nanotubes (CNTs), graphene, and metal nanowires, have been utilized as electronic conductors that may be combined with flexible substrates or elastomer matrices to form compliant electrodes, demonstrating visible light transmittance and electronic conductivity under deformed conditions. However, trade-offs between the electronic conductors' optical, electrical and mechanical properties may be inevitable, rendering significant efforts for optimizing their figure of merits.

In contrast, ionic conductors tend to be highly transparent and stretchable, and they do not suffer from the trade-offs present in electronic conductors since ionic conductors act as dielectrics at visible light wavelengths. Fatigue failure is also non-existent in ionic conductors even under long-time repeated stretching due to their intrinsic softness. Although an ion's mobility may be thousand of times lower than that of an electron, utilizing ionic conductors as electrodes remains suitable for applications such as soft actuators, electroluminescent (EL) devices, strain sensors, and capacitive touch sensors, where only small current is needed.

The concept of "ionic skin" was first set out in a hybrid iontronic circuit, which was designed by sandwiching an acrylic elastomer film between two ionic conductive hydrogel layers, and the formed parallel plate capacitor may detect capacitance increase upon dielectric elastomer's compression. This acts more like a pressure sensor as the tactile sensing is triggered by fingers' pressing. In addition, each sensing element has two distinct hydrogel electrodes, which may not be ideal for scaling up into a multi-touch sensor. Recently, combined ionic conductive electrodes with commercially successful p-cap sensing mechanism has been developed. Polyacrylamide (PAAm) hydrogel was filled into perpendicularly running channels built within a polydimethylsiloxane (PDMS) matrix and fabricated into a transparent, stretchable multi-touch sensor. However, like other electronic conducting base stretchable p-cap touch sensors, the x and y direction electrodes were distributed into two layers separated by a continuous dielectric elastomer film due to their limited electrode patterning capability. In such a device configuration, stretching, bending and touch induced pressure tend to reduce the dielectric layer's thickness and increase the electrodes' overlapping area, leading to $C_m$ value increment. Such $C_m$ increment variations induced by such external forces are undesirable and complicate a touch sensing signal's analyzing algorithm when the sensors were operated under deformed conditions.

In light of the above, there is a need to provide for a solution that ameliorates one or more of the abovementioned limitations for applications at least in a touch sensor panel. The solution of the present disclosure relates to an ionic conductive ink and a method to form the ionic conductive ink.

SUMMARY

In a first aspect, there is provided for an inkjet printable ionic conductive ink for producing a touch sensor device, wherein the inkjet printable ionic conductive ink comprises:
a hydrophilic polymer and an ionic salt;
a mixture of solvents in which the hydrophilic polymer and the ionic salt are dissolved therein to form a solution; and
a surfactant to render the solution inkjet printable.

In another aspect, there is provided for a method of producing an inkjet printable ionic conductive ink described according to the first aspect, the method comprising:
dissolving a hydrophilic polymer and an ionic salt in a mixture of solvents to form a solution; and
mixing the solution with a surfactant to render the solution inkjet printable.

In another aspect, there is provided for a flexible touch sensor panel comprising:
one or more rows of structures formed from the inkjet printable ionic conductive ink described according to the first aspect, wherein adjacent structures in each row are spaced apart and connected by a first ionic bridge;
one or more columns of structures formed from the inkjet printable ionic conductive ink described according to the first aspect, wherein adjacent structures in each column are spaced apart and connected by a second ionic bridge;
each of the one or more columns of structures are arranged substantially orthogonal to each of the one or more rows of structures to have each structure in the one or more columns spaced apart from each structure in the one or more rows, wherein the first ionic bridge is separated from the second ionic bridge by a dielectric material, and wherein the first ionic bridge vertically overlaps the second ionic bridge.

In another aspect, there is provided for a method of producing the flexible touch sensor panel as described above, the method comprising:

depositing the inkjet printable ionic conductive ink described according to the first aspect to form one or more rows of structures on a flexible substrate, wherein adjacent structures in each row are spaced apart and connected by a first ionic bridge;

coating a dielectric material on the first ionic bridge; and depositing the inkjet printable ionic conductive ink described according to the first aspect to form one or more columns of structures on the flexible substrate, wherein adjacent structures in each column are spaced apart and connected by a second ionic bridge, wherein each of the one or more columns of structures are deposited substantially orthogonal to each of the one or more rows of structures to have each structure in the one or more columns spaced apart from each structure in the one or more rows, wherein the first ionic bridge is separated from the second ionic bridge by the dielectric material, and wherein the first ionic bridge vertically overlaps the second ionic bridge.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which.

DETAILED DESCRIPTION

Figure 1A:
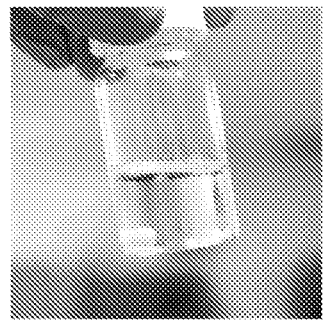
FIG. 1A shows a photo of an ionic conductive ink, which is a polyvinyl alcohol (PVA) based ionic conductive ink prepared using a mixture of solvents that includes water and dimethyl sulfoxide (DMSO).

The following detailed description refers to the accompanying drawings that show, by way of illustration, specific details and embodiments in which the invention may be practised. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the present disclosure, an ionic conductive gel may be patterned into electrodes via drop-on-demand (DOD) inkjet printing of an ionic conductive ink. When the ionic conductive ink dries and gels, the ionic conductive gel may be formed. The term "inkjet printing" and grammatical variants thereof used herein refers to a form of printing that involves recreation of a digital image from a computer as an example by propelling droplets of ink onto a substrate. The term "DOD" refers to a form of inkjet printing that either involves heat or a piezoelectric material to generate individual ink droplets then deposit them at desired locations on a substrate. For example, in thermal DOD inkjet printing, a pulse of current may be passed through a heating element that causes rapid vaporization of ink stored in a chamber to form a bubble, and the bubble causes a large pressure increase, thereby propelling a droplet of ink onto a substrate. In piezoelectric DOD inkjet printing, a voltage may be applied to cause the piezoelectric material to change its shape to generate a pressure pulse in the ink fluid stored in the chamber, which forces a droplet of ink from the nozzle onto a substrate.

Advantageously, the present approach suppresses deformation-induced $C_m$ changes through reconstruction of a touch sensor device's structure. The reconstruction abandons conventionally adopted parallel plate electrodes configuration and utilizes a coplanar electrode layout instead. To achieve the coplanar electrode layout, 2 μm ultrathin electrodes, as an example, may be fully inkjet printed with the use of an inkjet printable ionic conductive ink. The present approach circumvents use of a middle dielectric layer and reduces device thickness (e.g. of a touch sensor panel), hence successfully suppressing noises caused by any contortion. This also improves the touch sensor's sensitivity to an ultra-high extent (about 60.5% $C_m$ change) to a finger's touch, which boosts the touch sensor's signal to noise ratio (SNR). The thickness of 2 μm supports flexibility of the touch sensor device. For instance, if the touch sensor device is too thick, it may not be conformable to surfaces with curvature, thereby limiting the touch sensor device from being used with a curved surface. When the thickness is 2 μm, stability in the performance of the touch sensor device is not compromised. The term "flexible" used herein means an object which the term refers to can be subjected to any contortion without being damaged or having its performance compromised. The term "contortion" used herein refers to any shape deformation or shape distortion of an object, which may include but is not limited, bending, stretching, twisting, etc.

Figure 1B:
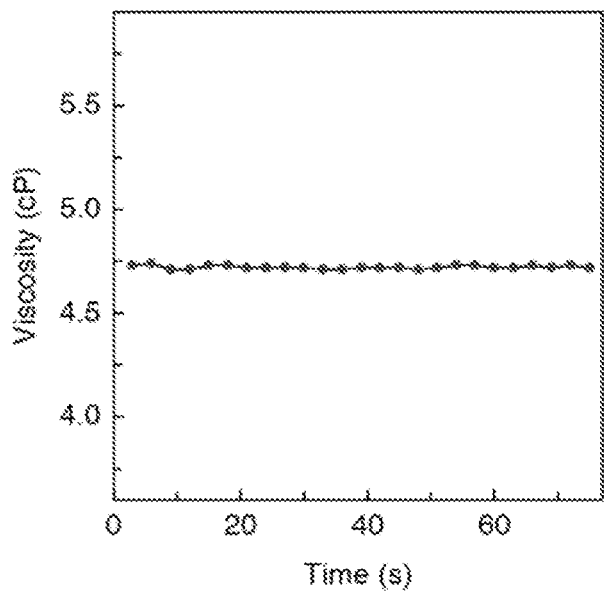
FIG. 1B shows a plot of dynamic viscosity of the ionic conductive ink measured at a constant shear rate of $100\ s^{-1}$.

In the present approach, DOD inkjet printing technology may be used as one example of a precise material patterning tool. Polyvinyl alcohol (PVA) based ionic conductive ink, which is fully transparent and non-viscous (see FIG. 1A), as a non-limiting example, may be prepared using solvents such as a mixture of water and dimethyl sulfoxide (DMSO). An inkjet printable ink may have a narrow operating window, which may require suitable viscosity and surface tension. The use of a siloxane surfactant may be needed to make the ionic conductive ink suitable for inkjet printing. The ink's dynamic viscosity at room temperature and 100 $s^{-1}$ shear rate may be 4.72 mPa·s (FIG. 1B), and its surface tension may be about 31 mN/m. The ink may be regarded as a shear stable Newtonian fluid, and such rheology properties fulfil the requirements of being a printable ink. Subsequently, the ink may be deposited onto a transparent elastic substrate according to pre-designed patterns. After partial dehydration and gelation process at room temperature, a thin layer of PVA based ionic conductive gel with ionic conductivity forms and may be utilized as an ionic conductive electrodes and in circuits. Compared to plastic based printed electronics, the present inkjet printed ionic conductive electrodes are highly transparent, biocompatible and reliable under any sort of contortion. The present approach illustrates its feasibility to pattern ionic conductor at tens of micrometers resolution via a non-contact and mask-less processes, and provides iontronics as a solution for fabricating robust and reliable stretchable devices using inkjet printable ionic conductive ink.

With the above in mind, details of the ionic conductive ink, its uses for touch sensor devices, method of production of the ionic conductive ink and the touch sensor devices, and their various embodiments, are described as follow.

In the present disclosure, there is provided for an inkjet printable ionic conductive ink for producing a touch sensor device. The inkjet printable ionic conductive ink may comprise a hydrophilic polymer and an ionic salt, a mixture of solvents in which the hydrophilic polymer and the ionic salt are dissolved therein to form a solution, and a surfactant to render the solution inkjet printable. The inkjet printable ionic conductive ink may also comprise a polymer electrolyte comprising a hydrophilic polymer and an ionic salt, a mixture of solvents in which the polymer electrolyte may be dissolved therein to form a solution, and a surfactant to render the solution inkjet printable. The inkjet printable ionic conductive ink, after deposition, may turn into a thin layer of ionic conductive gel. This ionic conductive gel may be termed herein as a "polymer electrolyte gel" or "ionic conductor". The terms "polymer electrolyte gel" and "ionic conductor" may be used interchangeably. The "polymer electrolyte gel" or "ionic conductor" may be a partially dried form of the ionic conductive ink. The term "partially dried" used herein with respect to the "polymer electrolyte gel" means that the polymer electrolyte gel may contain 20 wt % to 30 wt %, 20 wt % to 25 wt %, or 25 wt % to 30 wt %, of solvents. The partially dried polymer electrolyte gel may also contain an amount of solvents that falls within such specified range. The term "polymer electrolyte" used herein refers to a composite material formed of a polymer which may act as a matrix that permits movements of ions therein. The polymer used to form the ionic conductor may comprise or may be a hydrophilic polymer.

The hydrophilic polymer may comprise or consist of polyvinyl alcohol (PVA), polyacrylic acid (PAA), polyacrylamide (PAAm), or polyethylene glycol (PEG). Such polymers are sufficiently hydrophilic for forming ionic conductors with the use of polar solvents like water and dimethyl sulfoxide (DMSO). Such hydrophilic polymers are biocompatible polymers safe for human use. The polyvinyl alcohol may have a molecular weight ranging from 5,000 to 50,000 g/mol, 10,000 to 50,000 g/mol, 20,000 to 50,000 g/mol, 30,000 to 50,000 g/mol, 40,000 to 50,000 g/mol, 20,000 to 40,000 g/mol, 30,000 to 40,000 g/mol, 10,000 to 30,000 g/mol, 20,000 to 30,000 g/mol, 10,000 to 20,000 g/mol, 9,000 to 10,000 g/mol, 9,500 to 10,000 g/mol, 9,000 to 9,500 g/mol, etc. Any other hydrophilic polymer having a molecular weight range or value within these specified ranges may be used. Hydrophilic polymers having a higher molecular weight (Mw) may render the ink unprintable. A suitable maximum Mw may be, for example, 50,000 g/mol.

The hydrophilic polymer may be used to host the ionic salt. The ionic salt imparts ionic conductivity to the polymer electrolyte and hence the ionic conductive ink and ionic conductive gel. In other words, when the ionic salt is dissolved, it forms ions that may be mobile in the hydrophilic polymer. This implies that when a voltage or current is passed through the polymer electrolyte, the voltage or current may cause the ions to move. The ionic salt may be hygroscopic, which helps to retain water in the ionic conductive gel and preserve ionic conductivity for the long term. The hygroscopic ionic salt may comprise or dissolve to form an alkali metal cation and an anion that is monoatomic or polyatomic. As a non-limiting example, the ionic salt may comprise an alkali metal and a halogen. Such an ionic salt may be a lithium based ionic salt, which forms lithium cations when dissolved. One example of a lithium based ionic salt may comprise or may be a lithium halide. The term "alkali metal" used herein refers to an element from group 1 of the periodic table, which may include but is not limited to lithium, sodium. The term "halogen" used herein refers to an element from group 17 of the periodic table, which may include but is not limited to fluoride, chloride, iodide. For example, the ionic salt of the present ionic conductive ink may comprise or may be lithium chloride (LiCl), sodium chloride (NaCl), lithium bis(trifluoromethanesulfonyl)imide (LiTFSI), or lithium hexafluorophosphate ($LiPF_6$).

The hydrophilic polymer and ionic salt may be dissolved in a mixture of solvents. The mixture of solvents may be a binary mixture of solvents. This means that the mixture of solvents may be formed of two solvents. The mixture of solvents, or the binary mixture of solvents, may comprise or consist of organic solvents. In such instance, suitable organic solvents may include an organic solvent that can dissolve the hydrophilic polymer and ionic salt, and is compatible with the surfactant, for rendering the solution inkjet printable. The mixture of solvents, or the binary mixture of solvents, may also comprise or consist of an aqueous solvent and an organic solvent. The aqueous solvent helps to dissolve the hydrophilic polymer and ionic salt. The organic solvent, which may have a higher boiling point than the aqueous solvent, helps to increase the overall boiling point of the mixture of solvents and prevents nozzle clogging during inkjet printing. Using a mixture of solvents, such as a binary mixture of solvents, may also inhibit a coffee-ring effect and lead to a more uniform surface morphology of an inkjet printed ionic conductive gel. The mixture of solvents, or the binary mixture of solvents, may comprise water and dimethyl sulfoxide (DMSO), water and glycerin, water and ethylene glycol, water and diethylene glycol, or water and propylene glycol. Water may be the base component of the binary mixture of solvents. In other words, water may form the major component in a binary mixture of solvents. Other organic solvents that help to increase overall boiling point of the mixture of solvents, and are compatible with an aqueous solvent, may be used.

The water and the dimethyl sulfoxide may be present in a volume ratio ranging from 10:1 to 2:1, 9:1 to 2:1, 8:1 to 2:1, 7:1 to 2:1, 6:1 to 2:1, 5:1 to 2:1, 4:1 to 2:1, or 3:1 to 2:1. The ratios demonstrate that the versatility of using a mixture of solvents. Use of such ratios may also control or vary the properties of the ionic conductive ink and hence, the printing properties of the ionic conductive ink.

The present ionic conductive ink may include a surfactant to render the ionic conductive ink inkjet printable. The surfactant may be or may comprise a non-ionic polymer. Surfactants that are non-ionic polymers may be termed herein as "non-ionic polymeric surfactants". Such surfactants, compared to small molecule surfactants, are much more effective even when added in lesser amounts, as the higher molecular weight of the non-ionic polymeric surfactants provides for higher interfacial concentration (i.e. concentration at the substrate's surface). The non-ionic polymer chains do not interact with the ionic salt and hence both physical and chemical properties of the non-ionic polymeric surfactants are not affected when used with ionic salt (e.g. LiCl for forming the present ionic conductive ink). This helps ensure good compatibility between components of the ionic conductive ink. Besides, such surfactants are stable in various conditions, i.e. temperature, acidity/basicity, etc. The surfactant, which may include examples of non-ionic polymeric surfactant, may comprise or may consist of a siloxane, a hydrophobically modified cellulose and derivative thereof, an ethoxylated polyacrylate, a novolac resin ethoxylate, or an ethylene oxide-propylene oxide copolymer. The siloxane may be a polyether modified siloxane. Selection of surfactants for forming the present ionic conductive ink is not limited to the above, as other siloxane surfactants may be used. The surfactant helps to reduce surface tension of the ionic conductive ink and enhances wetting between the ionic conductive ink and substrate.

The present disclosure also provides for a method of producing an inkjet printable ionic conductive ink described according to various embodiments of the first aspect. The method may comprise dissolving a hydrophilic polymer and an ionic salt in a mixture of solvents to form a solution, and mixing the solution with a surfactant to render the solution inkjet printable. Embodiments and advantages described in the context of the present inkjet printable ionic conductive ink are analogously valid for its method of production as described herein, and vice versa.

In the present method, dissolving the hydrophilic polymer and ionic salt may comprise mixing the hydrophilic polymer with the mixture of solvents in an amount which is less than 10 wt %, less than 9 wt %, less than 8 wt %, less than 7 wt %, less than 6 wt %, less than 5 wt %, less than 4 wt %, less than 3 wt %, less than 2 wt %, less than 1 wt %. The amount of hydrophilic polymer, however, is more than 0 wt %. The wt % may be calculated by dividing weight of the hydrophilic polymer by weight of the inkjet printable ionic conductive ink. Different loading of hydrophilic polymer may influence the ionic conductive ink's viscosity and hence, the printing properties of the ionic conductive ink.

For the sake of brevity, embodiments and advantages associated with the hydrophilic polymer shall not be iterated as they have already been described above in various embodiments of the first aspect. For example, it has already been described above that the hydrophilic polymer may comprise or consist of polyvinyl alcohol, polyacrylic acid, polyacrylamide, or polyethylene glycol. The polyvinyl alcohol has a molecular weight ranging from, for example, 5,000 to 50,000 g/mol, or 9,000 to 10,000 g/mol, etc. Other molecular weight ranges/values have already been described above.

In the present method, the dissolving may comprise mixing the ionic salt with the mixture of solvents in an amount ranging from 1 to 10 wt %, 2 to 10 wt %, 3 to 10 wt %, 4 to 10 wt %, 5 to 10 wt %, 6 to 10 wt %, 7 to 10 wt %, 8 to 10 wt %, or 9 to 10 wt %. The wt % may be calculated by dividing weight of the ionic salt by weight of the inkjet printable ionic conductive ink. If the amount of ionic salt falls below 1 wt %, the resultant ionic conductive ink may suffer from poor conductivity. On the other hand, mixing more than 10 wt % ionic salt may render the ionic conductive ink too hygroscopic for conversion into its gel form.

For the sake of brevity, embodiments and advantages associated with the ionic salt shall not be iterated as they have already been described above in various embodiments of the first aspect. For example, it has already been described above that the ionic salt may comprise or consist of an alkali metal and a halogen. For example, the ionic salt may comprise or may be LiCl, NaCl, LiTFSI, or LiPF$_6$.

To dissolve the hydrophilic polymer and ionic salt, the mixture of solvents may be prepared first. The mixture of solvents prepared may be a mixture of organic solvents. The mixture of solvents may also be prepared by mixing a binary mixture of solvents comprising an aqueous solvent and an organic solvent to form the mixture of solvents. This may include, as a non-limiting example, mixing water and dimethyl sulfoxide, water and glycerin, water and ethylene glycol, water and diethylene glycol, or water and propylene glycol. Mixing of the water and the dimethyl sulfoxide may comprise mixing the water and the dimethyl sulfoxide in a volume ratio ranging from 10:1 to 2:1, 9:1 to 2:1, 8:1 to 2:1, 7:1 to 2:1, 6:1 to 2:1, 5:1 to 2:1, 4:1 to 2:1, or 3:1 to 2:1.

Once the solution is prepared, the solution may be mixed with the surfactant by adding the surfactant in an amount ranging from 0.01 to 0.1 wt %, 0.02 to 0.1 wt %, 0.03 to 0.1 wt %, 0.04 to 0.1 wt %, 0.05 to 0.1 wt %, 0.06 to 0.1 wt %, 0.07 to 0.1 wt %, 0.08 to 0.1 wt %, or 0.09 to 0.1 wt %, to the solution. The wt % may be calculated by dividing weight of the surfactant by weight of the inkjet printable ionic conductive ink solution. The more surfactant is added to the ink, the lower the surface tension of the ionic conductive ink. The surface tension reducing effect may saturate at around 0.1 wt %, which means that further addition of the surfactant may not further reduce the surface tension.

For the sake of brevity, embodiments and advantages associated with the surfactant shall not be iterated as they have already been described above in various embodiments of the first aspect. For example, it has already been described above that the surfactant may be or may comprise a non-ionic polymer. The non-ionic polymer may comprise or consist of a siloxane, a hydrophobically modified cellulose and derivative thereof, an ethoxylated polyacrylate, a novolac resin ethoxylate, or an ethylene oxide-propylene oxide copolymer. The siloxane may be a polyether modified siloxane.

The present ionic conductive ink described above may be used for or used in producing a touch sensor device. Such device may include any device that requires touch sensor technology. Such device may comprise or may be a touch sensor panel. The present disclosure accordingly relates to a touch sensor panel formed from the present ionic conductive ink, and a method of producing such a touch sensor panel.

The present disclosure provides for a flexible touch sensor panel. The term "flexible" has already been defined above.

Embodiments and advantages described in the context of the present inkjet printable ionic conductive ink and the method of producing such inkjet printable ionic conductive ink are analogously valid for the present flexible touch sensor panel as described herein, and vice versa. For the sake of brevity, various embodiments associated and advantages associated with the present inkjet printable ionic conductive ink and the method of producing such inkjet printable ionic conductive ink shall not be iterated.

The flexible touch sensor panel may comprise one or more rows of structures formed from the inkjet printable ionic conductive ink described according to various embodiments of the first aspect, wherein adjacent structures in each row are spaced apart and connected by a first ionic bridge, one or more columns of structures formed from the inkjet printable ionic conductive ink described according to various embodiments of the first aspect, wherein adjacent structures in each column are spaced apart and connected by a second ionic bridge, each of the one or more columns of structures are arranged substantially orthogonal to each of the one or more rows of structures to have each structure in the one or more columns spaced apart from each structure in the one or more rows, wherein the first ionic bridge is separated from the second ionic bridge by a dielectric material, and wherein the first ionic bridge vertically overlaps the second ionic bridge. The term "substantially orthogonal" may include arrangement of the one or more rows of structures at an angle ranging from 75° to 90° with respect to the one or more columns of structures. Without being limited to theory, arrangement of the one or more rows of structures at an angle ranging from more than 0° and up to 90° with respect to the one or more columns of structures may also be used. Such arrangements render formation of a non-perpendicular parallelogram array.

The structures for each of the one or more rows may be spaced apart with a gap ranging from 5 to 10 mm, 6 to 10 mm, 7 to 10 mm, 8 to 10 mm, or 9 to 10 mm, etc. Said differently, adjacent rows of structures may have a gap of 5 to 10 mm, 6 to 10 mm, 7 to 10 mm, 8 to 10 mm, or 9 to 10 mm, etc. between each rows. The structures for each of the one or more columns may be spaced apart with a gap ranging from 5 to 10 mm, 6 to 10 mm, 7 to 10 mm, 8 to 10 mm, or 9 to 10 mm, etc. Said differently, adjacent columns of structures may have a gap of 5 to 10 mm, 6 to 10 mm, 7 to 10 mm, 8 to 10 mm, or 9 to 10 mm, etc. between each columns. The gap between a structure from a row and a structure from a column may be 0.5 to 1 mm, 0.6 to 1 mm, 0.7 to 1 mm, 0.8 to 1 mm, 0.9 to 1 mm. Each of the gaps mentioned above is designed to enhance resolution and maximize sensitivity of the present flexible touch sensor panel, which may be used in a touch sensor device such as a capacitive touch sensor.

The one or more rows of structures and the one or more columns of structures may be arranged to be coplanar. This means that the one or more rows of structures may be arranged to be in the same plane as the one or more columns of structures, and vice versa. Such an arrangement advantageously reduces thickness of overall touch sensor panel. The overall thickness of the touch sensor panel may range from 0.3 mm to 1 mm.

The first ionic bridge and the second ionic bridge may be formed of the ionic conductive ink as described in various embodiments of the first aspect. In other words, there is no need to use a distinct material for forming the connecting bridge between the structures lined up in each row or column. The term "ionic bridge" used herein refers to a structure that connects adjacent structures arranged in a row or in a column and allows transfer for ions between the structures in each row or in each column.

In various embodiments, each structure of the one or more rows of structures and of the one or more columns of structures may have a quadrilateral cross-section, when viewed from a top-down perspective. The quadrilateral cross-section may comprise or consist of a diamond shaped cross-section. The quadrilateral cross-section, including the diamond shaped cross-section enables the coplanar layout to be implementable. Compared to rows and columns of structures formed of simple stripes, such structures having a quadrilateral cross-section allows a pair of structures, one from a column and one from a row, to be arranged closer, thereby enhancing projection of the fringing field, which can boost sensitivity of the touch sensor panel.

In the present flexible touch sensor panel, the dielectric material may comprise an elastomeric material. The elastomeric material may comprise polydimethylsiloxane, silicone, acrylic, or polyurethane. Said differently, the dielectric material may comprise polydimethylsiloxane, silicone, acrylic, or polyurethane. In certain embodiments, the dielectric material may consist of polydimethylsiloxane.

As mentioned above, the substrate on which the structures are formed may be a flexible substrate. In other words, the one or more rows of structures and the one or more columns of structures may be arranged on a flexible substrate, wherein the flexible substrate which the one or more rows of structures and the one or more columns of structures are arranged thereon may be the same flexible substrate. The flexible substrate may be an elastomer comprising polydimethylsiloxane, silicone, acrylic, or polyurethane.

In various embodiments, the present flexible touch sensor panel may further comprise an encapsulating layer which encapsulates the one or more rows of structures, the one or more columns of structures, and the dielectric material. Encapsulation of the one or more rows of structures, the one or more columns of structures, and the dielectric material, may include encapsulation of the first ionic bridge and the second ionic bridge.

For the present flexible touch sensor panel, the dielectric material, the flexible substrate, and the encapsulating layer, may each comprise an elastomeric material having substantially similar elastic modulus ranging from 0.5 to 5 MPa. This means that the dielectric material, the flexible substrate, and the encapsulating layer, may have an elastic modulus from such a range, for example, 1 MPa, 2 MPa, and 3 MPa, respectively. Advantageously, this enhances flexibility of the present touch sensor panel such that when subjected to any contortion, none of the components therein get damaged and conform to the contortion. The present touch sensor panel continues to be able to accurately sense input from a user, which does not get distorted due to it being contorted. The dielectric material, the flexible substrate, and the encapsulating layer may be formed of the same or different elastomeric material.

The one or more rows of structures and the one or more columns of structures may each have a height which is 2 µm or less. The advantage of this thickness range has already been mentioned above. At thicknesses of this range, noise suppression and stability of the performance of the touch sensor panel are not compromised. Instead, the touch sensor panel's sensitivity is improved to an ultra-high extent, e.g. about 60.5% $C_m$ change to a finger's touch, which boosts the sensor's signal to noise ratio (SNR). Such a thickness range also supports flexibility of the touch sensor device and renders the touch sensor panel versatile in various applications that requires the touch sensor panel to be used with a curved surface. The one or more rows of structures and the one or more columns of structures form the electrodes of the present touch sensor panel.

The present disclosure further provides for a method of producing the flexible touch sensor panel as described above. The method may comprise depositing the inkjet printable ionic conductive ink described according to various embodiments of the first aspect to form one or more rows of structures on a flexible substrate, wherein adjacent structures in each row are spaced apart and connected by a first ionic bridge, coating a dielectric material on the first ionic bridge, and depositing the inkjet printable ionic conductive ink described according to various embodiments of the first aspect to form one or more columns of structures on the flexible substrate, wherein adjacent structures in each column are spaced apart and connected by a second ionic bridge, wherein each of the one or more columns of structures are deposited substantially orthogonal to each of the one or more rows of structures to have each structure in the one or more columns spaced apart from each structure in the one or more rows, wherein the first ionic bridge is separated from the second ionic bridge by the dielectric material, and wherein the first ionic bridge vertically overlaps the second ionic bridge.

Embodiments and advantages described in the context of the present inkjet printable ionic conductive ink, the method of producing such inkjet printable ionic conductive ink, and the present flexible touch sensor panel, are analogously valid for the present method of producing the present flexible touch sensor panel as described herein, and vice versa. For the sake of brevity, various embodiments associated and advantages associated with the present inkjet printable ionic conductive ink, its method of production, and the present flexible touch sensor panel shall not be iterated.

Deposition of the inkjet printable ionic conductive ink to form the one or more rows of structures and the one or more columns of structures may comprise inkjet printing the inkjet printable ionic conductive ink on the flexible substrate. Embodiments and advantages associated with inkjet printing have already been discussed above and shall not be iterated for brevity.

Various embodiments and advantages of the flexible substrate have already been described above and shall not be iterated for brevity. The flexible substrate may be subjected to oxygen plasma treatment prior to depositing the inkjet printable ionic conductive ink to form the one or more rows of structures and the one or more columns of structures. Advantageously, this renders the surface of the flexible substrate hydrophilic, which improves adhesion of the inkjet printable ionic conductive ink that is deposited thereon.

The inkjet printing may comprise applying a voltage of 14 to 20 V to the inkjet printable ionic conductive ink. For example, a voltage of 16 V may be applied.

Deposition of the inkjet printable ionic conductive ink to form the one or more rows of structures and the one or more columns of structures may comprise arranging the one or more rows of structures and the one or more columns of structures to be coplanar. This means that the ionic conductive ink gets deposited in the same plane for forming the rows and columns of structures.

Deposition of the inkjet printable ionic conductive ink to form the one or more rows of structures and the one or more columns of structures may comprise forming each structure of the one or more rows of structures and of the one or more columns of structures to have a quadrilateral cross-section, when viewed from a top-down perspective. The quadrilateral cross-section may comprise a diamond shaped cross-section.

Deposition of the inkjet printable ionic conductive ink to form the one or more rows of structures and the one or more columns of structures may comprise drying the inkjet printable ionic conductive ink at a temperature ranging from 20° C. to 30° C. Advantageously, the present method does not require thermal treatment, other than optionally drying at room temperatures (e.g. 20° C. to 30° C.), to form the rows and columns of structures.

In the present method, the coating may comprise drop-casting the dielectric material on the first ionic bridge to separate the first ionic bridge from the second ionic bridge. Apart from drop-casting, 3D printing may be used. Any other suitable technique to coat the first ionic bridge such that it gets separated from the second ionic bridge may be used. The first ionic bridge may be formed when depositing the one or more rows of structures. The second ionic bridge may be formed when depositing the one or more columns of structures.

The present method may further comprise encapsulating the one or more rows of structures, the one or more columns of structures, and the dielectric material, with an encapsulating layer. Encapsulating the one or more rows of structures, the one or more columns of structures, and the dielectric material, may include encapsulating the first ionic bridge and the second ionic bridge. The dielectric material, the flexible substrate, and the encapsulating layer may each comprise an elastomeric material having substantially similar elastic modulus ranging from 0.5 to 5 MPa. This means that the dielectric material, the flexible substrate, and the encapsulating layer, may have an elastic modulus from such a range, for example, 1 MPa, 2 MPa, and 3 MPa, respectively.

In various embodiments, the one or more rows of structures and one or more columns of structures may be connected to a read-out circuit for extracting information sensed by the present flexible touch sensor panel.

In the context of the present disclosure, the word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance. The variance may be ±0.1%, ±0.5%, ±1%, ±5%, or even ±10%.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure provides for an ionic conductive ink for use in touch sensor panels. The ionic conductive ink is formable into an ionic conductive gel when it is left to dry and gel at room temperatures. The present disclosure also relates to a method of producing the ionic conductive ink. The ionic conductive ink may be used in touch sensor applications, such as touch sensor panels. The present disclosure may provide for a touch panel sensor comprising the present ionic conductive ink and a method of production of the touch panel sensor.

Details of the present ionic conductive ink, its uses, and method of fabricating the ionic conductive ink, are discussed, by way of non-limiting examples, as set forth below.

Example 1A: Present Ionic Conductive Ink

An example of the present ionic conductive ink for use in touch sensor panel may include a polymer electrolyte comprising a low molecular weight hydrophilic polymer, an ionic salt, binary mixture solvent, and a surfactant, wherein the low molecular weight hydrophilic polymer is polyvinyl alcohol with molecular weight (Mw) of 9,000 to 10,000 g/mol, wherein the ionic salt is lithium chloride, wherein the surfactant is a polyether modified siloxane surfactant, wherein the binary mixture solvent is deionized water and dimethyl sulfoxide. The ionic conductive ink formed from such materials may be inkjet printed.

Example 1B: Present Method of Producing the Ionic Conductive Ink

An example of the present method to form the present ionic conductive ink may include mixing deionized water and dimethyl sulfoxide (DMSO) together in a volume ratio of 10:1 to 2:1 to form a binary mixture solvent, dissolving less than 10 wt % low molecular weight polyvinyl alcohol (PVA, Mw 9,000 to 10,000 g/mol) into the binary mixture solvent to form a second solution. Subsequently dissolving 1 to 10 wt % lithium chloride (LiCl) into the second solution, and adding 0.01 to 0.1 wt % polyether modified siloxane surfactant, and stirring for 5 minutes at room temperature (e.g. 20° C. to 30° C.). The PVA can be replaced by other low molecular weight hydrophilic polymers, such as polyacrylic acid (PAA), polyacrylamide (PAAm) and polyethylene glycol (PEG), etc. For the ionic salt, sodium chloride (NaCl), LiTFSI, $LiPF_6$, etc. may be used instead.

Example 1C: Present Touch Sensor Panel

An example of the present touch sensor panel may include a first set of ionic conductive gel comprising interlocking diamonds with bridges arranged in a first direction on a substrate, a second set of ionic conductive gel comprising interlocking diamonds with bridges arranged in a second direction that is orthogonal to the first direction, wherein a dielectric is sandwiched between the first and second sets of ionic conductive gel at the bridges, an encapsulating layer encapsulating the first and second sets of ionic conductive material with the sandwiched dielectric; and wherein the substrate, dielectric and encapsulating layer may each comprise an elastomeric material with substantially similar elastic modulus. The ionic conductive gel is formed from the ionic conductive ink.

Example 1D: Present Method of Producing the Touch Sensor Panel

Figure 1C:
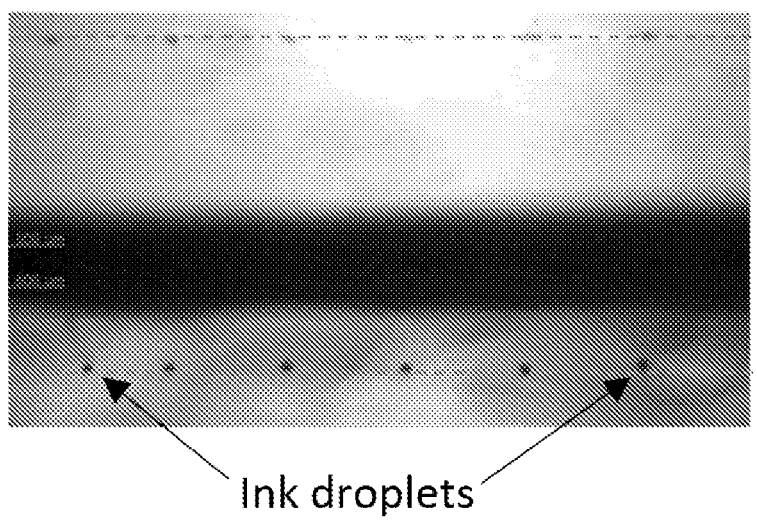
FIG. 1C shows ink droplet velocity monitored using a drop watcher. The strobe delay time was set at 100 μs, and in the photo, the droplets are at 800 μm line as indicated therein, and the drop velocity of these droplets is accordingly 8 m/s.

A method of producing the present touch sensor panel may include:

a) providing an ionic conductive ink and a transparent elastic substrate such as PDMS elastomer thin film. The PDMS elastomer in the present method can be replaced by silicone, acrylic, and polyurethane elastomers.

b) depositing a first layer of the ionic conductive ink on the PDMS elastomer thin film according to a pre-designed pattern comprising interlocking diamonds with bridges.

c) allowing the first layer of ionic conductive ink to dry and gel at room temperature to form a first thin layer of ionic conductive gel which represents the first layer of electrodes.

d) coating a layer of dielectric on the bridges of the first thin layer of ionic conductive gel.

e) depositing, further, a second thin layer of ionic conductive ink according to the pre-designed pattern comprising interlocking diamonds with bridges wherein the second thin layer of ionic conductive gel formed becomes orthogonal to the first thin layer of ionic conductive gel.

f) allowing the second layer of ionic conductive ink to dry and gel at room temperature to form a second thin layer of ionic conductive gel which represents the second layer of electrodes.

g) connecting the first and second thin layers of ionic conductive gel to an external read-out circuit. Accordingly, the electrodes are formed of the ionic conductive gel.

h) encapsulating the first and second layers of ionic conductive gel with an encapsulating layer.

i) the PDMS elastomer thin film may be prepared and its surface may be activated with oxygen plasma treatment to achieve surface hydrophilicity.

j) depositing the first and second layers of ionic conductive ink may include DOD inkjet printing.

k) the inkjet printing may include applying 16 V jetting voltage to the nozzles that corresponds to around 8 m/s droplet velocity (FIG. 1C). The jetting voltage may be ranging from 14 V to 20 V, which corresponds to a droplet speed from 7 m/s to 9 m/s, respectively. Jetting frequency is also adjustable from 1 kHz to 15 kHz.

l) allowing the first and second layers of ionic conductive ink to dry and gel may include keeping samples at room temperature (e.g. 20° C. to 30° C.) for 12 hours after depositing first layer of ionic conductive ink.

m) coating a layer of dielectric on bridges may include drop-casting PDMS mixture to cover all bridge areas of the first layer of ionic conductive gel to form the dielectric separators.

n) depositing a second thin layer of ionic conductive gel may include printing a second layer of ionic conductive ink perpendicular to the first layer of ionic conductive gel by the same step in (k).

Example 1F: Characterization of the Printed Ionic Conductor Gel

Figure 2A:
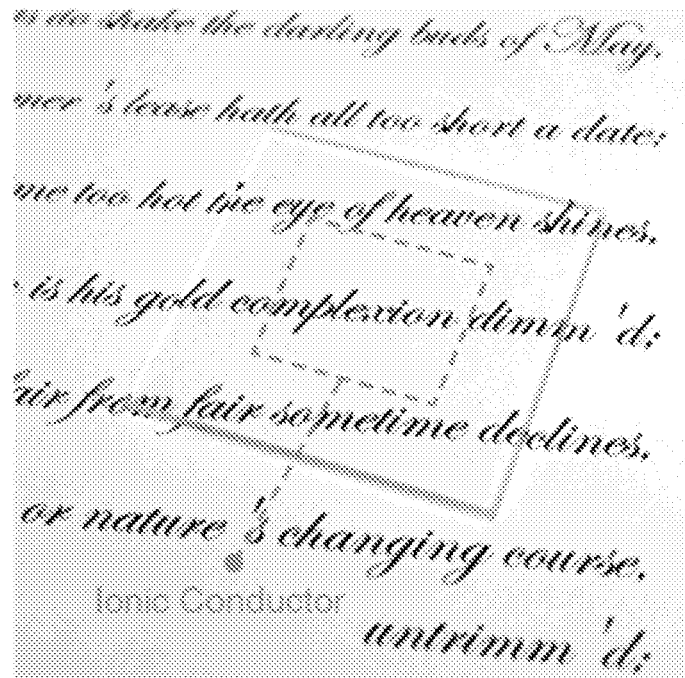
FIG. 2A shows a photo of the present ionic conductor gel on a polydimethylsiloxane (PDMS) substrate.
Figure 2B:
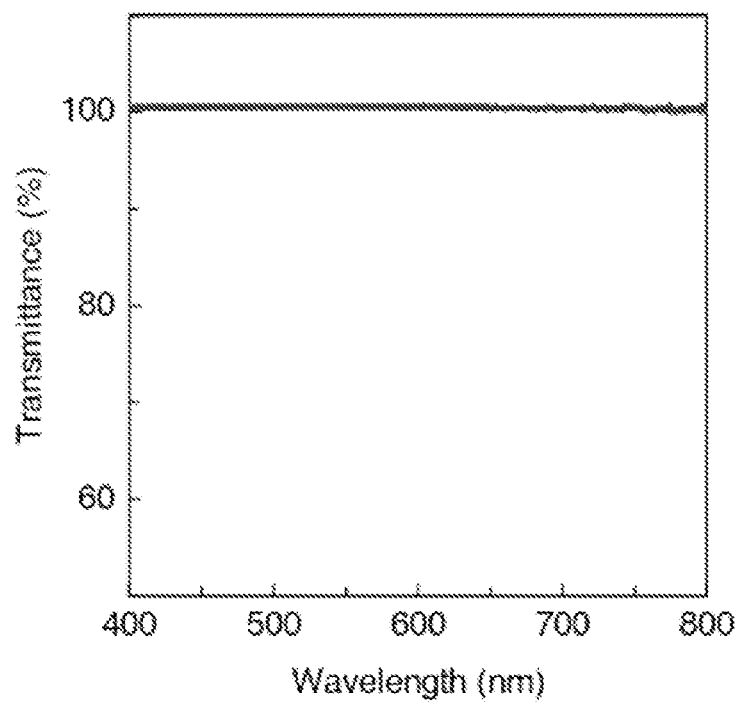
FIG. 2B shows a plot of the ultraviolet-visible (UV-Vis) spectrum of the printed thin layer of ionic conductor gel of FIG. 2A.
Figure 2C:
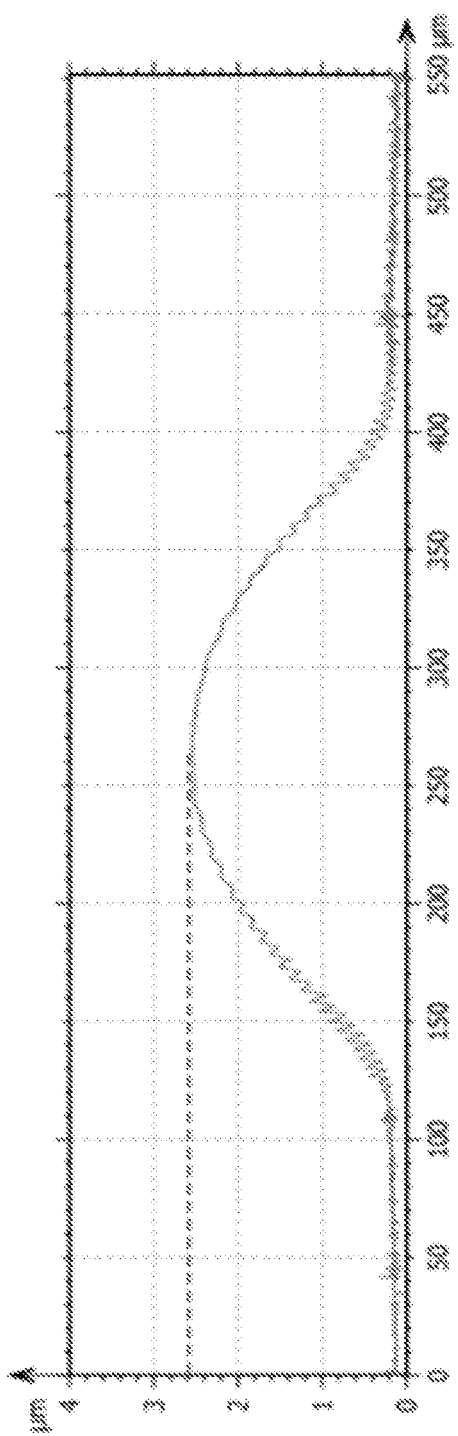
FIG. 2C shows a profile image indicating the cross section of a 300 μm width line formed of the present ionic conductor gel. Such a line may be termed herein as an "ionic conductor line".
Figure 2C:
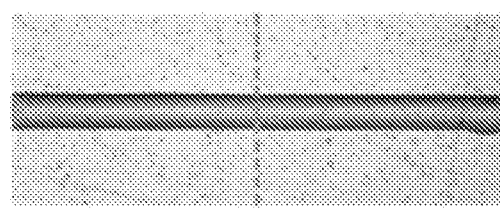
Figure 2D:
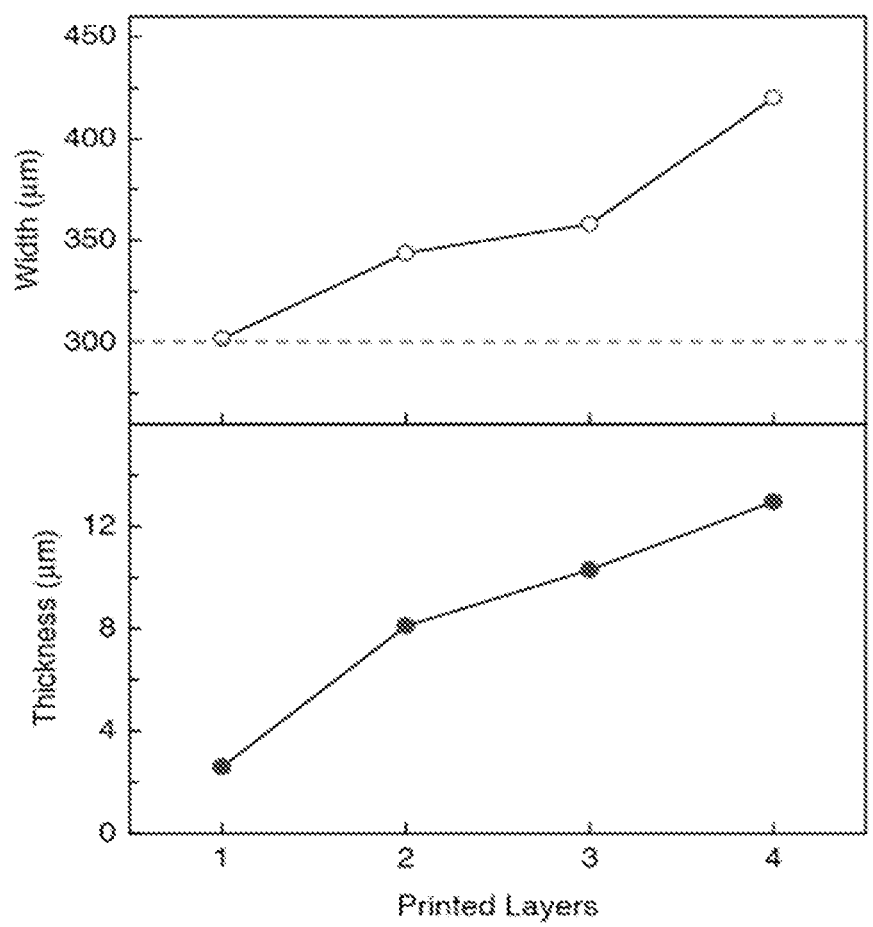
FIG. 2D shows a plot of the width (top) and thickness (bottom) of the ionic conductor lines as a function of the printed layer.
Figure 2E:
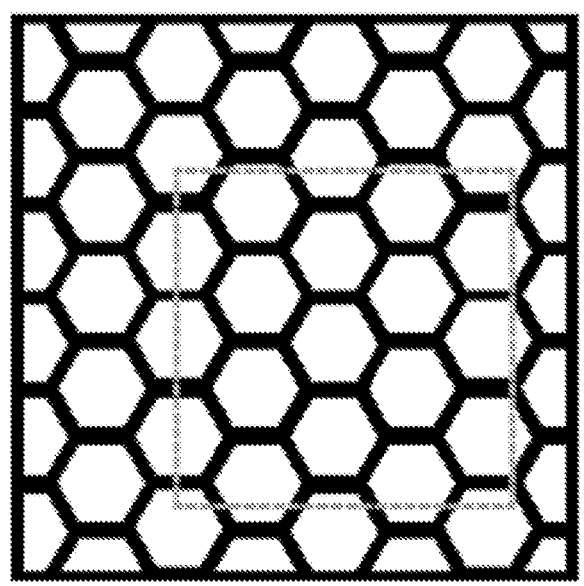
FIG. 2E shows a bitmap image pattern file (bmp) of a honeycomb pattern input into an inkjet printer for printing with the ionic conductive ink.
Figure 2F:
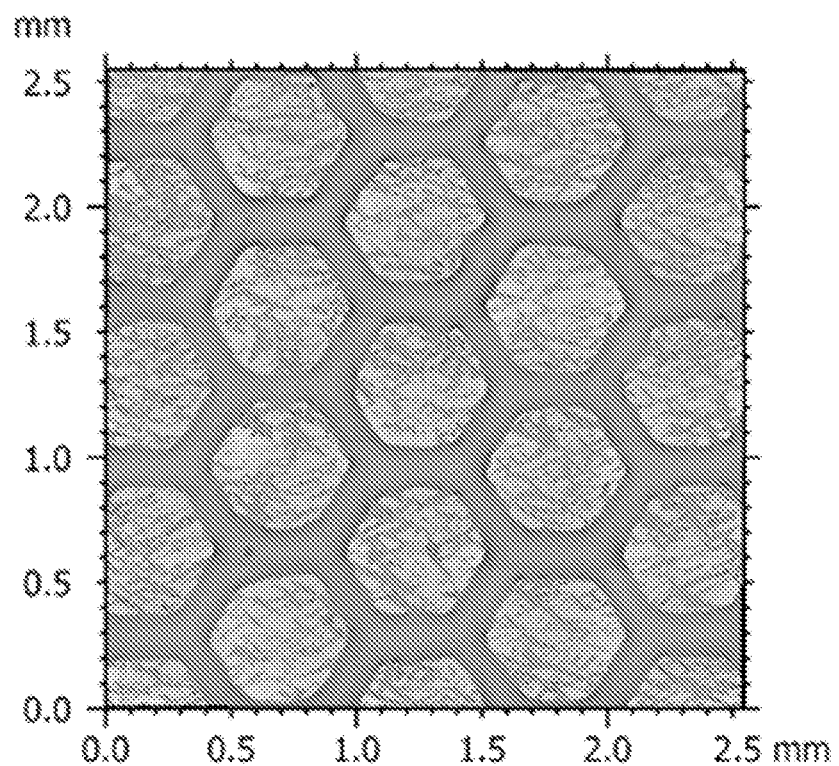
FIG. 2F is an optical microscopy image of the inkjet printed honeycomb microstructure.
Figure 2G:
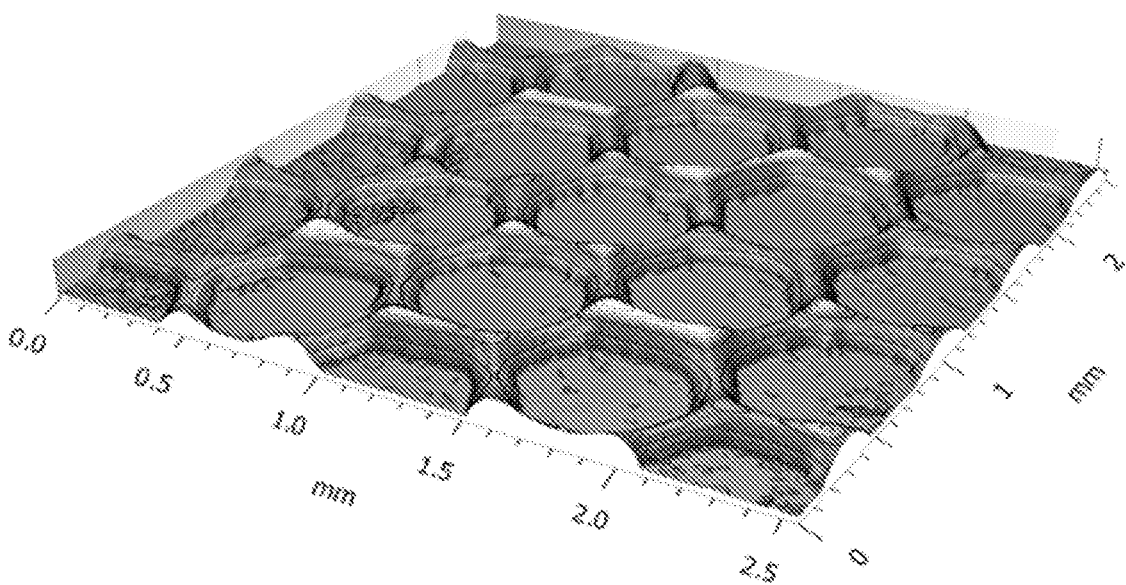
FIG. 2G shows a 3D view of the inkjet printed honeycomb microstructure.

Optical transmittance, thickness and topography of an inkjet printed ionic conductor gel has been characterized. FIG. 2A is a photo of the present PVA ionic conductor gel on a PDMS substrate. The thickness of the cured PDMS elastomer thin film was about 600 μm, and its planar dimension was 43 mm×43 mm. The words beneath could be clearly read since the conductor has nearly 100% transmittance over the visible spectrum region (FIG. 2B). 300 μm width line printing was performed, and the profile images of 1 to 4 printed layers were extracted by optical confocal microscope. From the cross-section profiles, it was found that the ionic conductor gel with only one printed layer corresponds to approximately a 2.3 to 2.4 μm thickness (FIG. 2C), noting that the baseline in FIG. 2C is not exactly zero. As shown in FIG. 2D, the line thickness increases accordingly when additional printing traces were applied. The pre-designed 300 μm line width was well followed by single layer printed lines. However, extrusion was observed when multi-layers were printed. The ability to pattern sophisticated microstructures with inkjet printing technology was demonstrated in FIG. 2E to 2G. The inkjet printer received a honeycomb pattern information from a bmp file (FIG. 2E), which then deposited the ionic conductive ink accurately in a prearranged position according to the bmp file. The optical microscopy image and the 3D topography view of the ionically conductive honeycomb meshwork are shown in FIGS. 2F and 2G. 3 layers were printed in this case, where the thickness and line width of the meshwork were about 11 μm and 150 μm.

Example 2A: Coplanar Electrode Layout

Figure 3A:
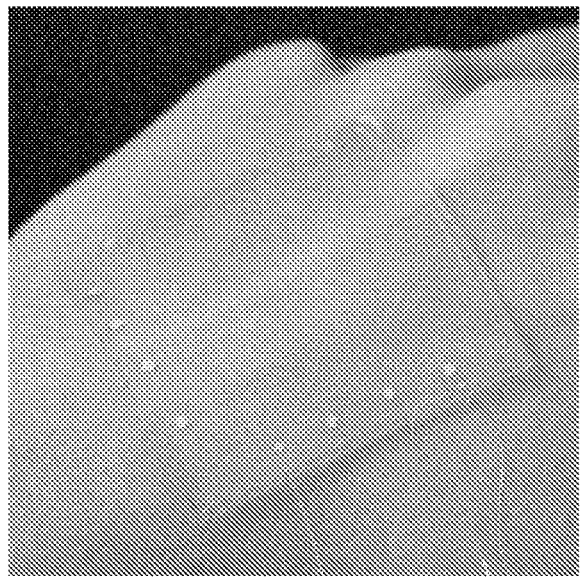
FIG. 3A shows a photo of the present touch sensor device having 4×4=16 sensing pixels. The present touch sensor device may be a touch sensor panel.
Figure 3B:
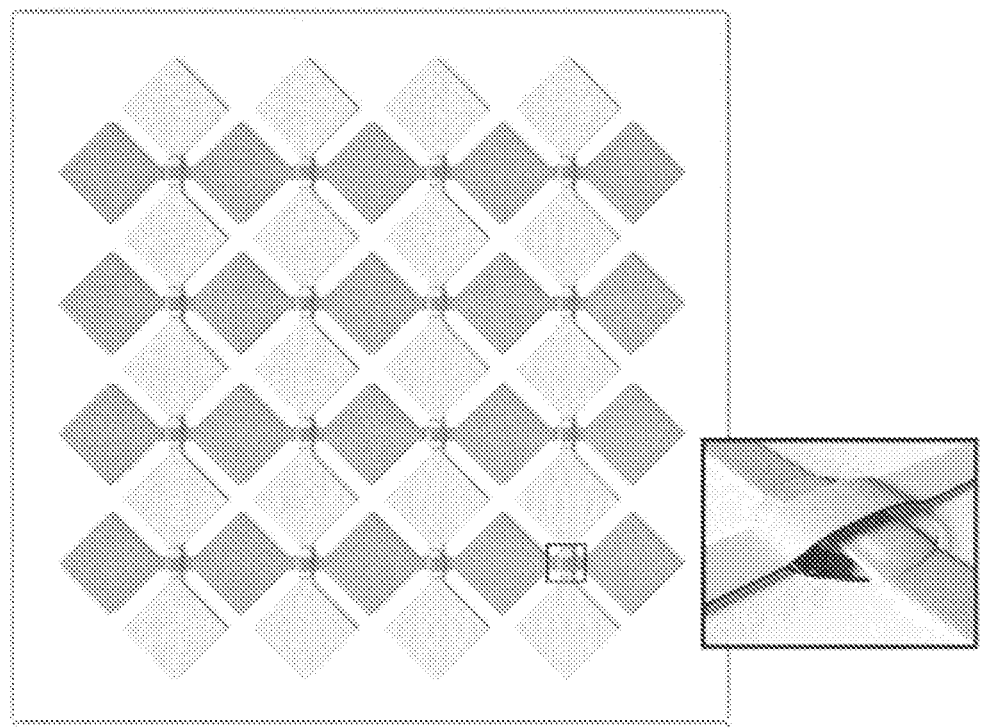
FIG. 3B shows the electrode layout based on interlocking diamonds pattern printed with the present ionic conductive ink. The detailed illustration of bridge intersection is shown in the small window.

The present approach harnesses DOD inkjet printer's high resolution patterning capability, which allows for fabricating electrodes with finer structures formed of ionic conductive gel compared to conventional fabrications that only allow designs of simple crossing bars. In the present approach, the electrode patterning strategy, which may be termed "interlocking diamond", was adopted to build coplanar ionic conductive electrodes formed of the ionic conductive gel. The layout consisted of squares tilted at a 45° angle, connected at two corners via a small bridge. In a coplanar layout, dielectric separators are built to insulate the first bridge before depositing the second layer bridge on top. For stretchable touch sensor devices, different or same elastomers may be used as the separators. The different elastomers, however, should be comparable in terms of mechanical properties. The mechanical properties may be consistent with the materials used for the substrate and encapsulating layer to avoid elastic modulus mismatch. FIG. 3B depicts the schematic of a proof-of-concept 4×4 touch sensing array, and the intersection detail is illustrated with magnification. In FIG. 3B, The diagonal length of diamond square is 5.5 mm, the space between two adjacent sensing pixels is 7 mm and the width of connecting bridge is 0.9 mm. As demonstrated herein, setting both x and y axes electrodes in the same plane eliminates use of a middle dielectric layer and renders the present touch sensor device immune to mechanical deformation. Besides, absence of an electric field confined between parallel plates advantageously translates to a higher fringing field ratio, which may enhance a touch sensor device's sensitivity.

Utilizing p-cap sensing mechanism and the present coplanar electrode architecture, the touch sensing pixels of the present touch sensor device can be scaled up without increasing the number of interconnects. The number of contacts is 2n for the case of an array of n×n=$n^2$ pixels. In the present approach, the space consumed by the interconnects is minimal when the array size is scaled up. Another attractive feature of p-cap touch sensor device is that its resolution can be adjusted in proportion to the dimension of the electrodes, so such devices can be constructed to sense at much larger or smaller scales depending on different application needs. These features, including the viability of scaling up and the adjustable sensing scale, may be facilitated by DOD inkjet printing technology, which can provide for an additive manufacturing process and the electrode pattern size may be designed via computer-aided patterning design.

The selection of deformable and transparent materials, including PDMS dielectrics and PVA ionic conductive gel, makes the present iontronic touch sensor device highly transparent and stretchable. FIG. 3A shows the photo of a presently fabricated 4×4 touch sensor device, which exhibits good optical transparency at visible light region as well as conformability to human skin. Through the present inkjet printable ionic conductive ink, an ultrathin touch sensor panel having ultrahigh touch sensitivity and immunity to external force is obtainable, making the touch sensor panel a robust and reliable human-machine interface at any deformed status.

Example 2B: Sensitivity of Present Touch Sensor Device

Figure 3C:
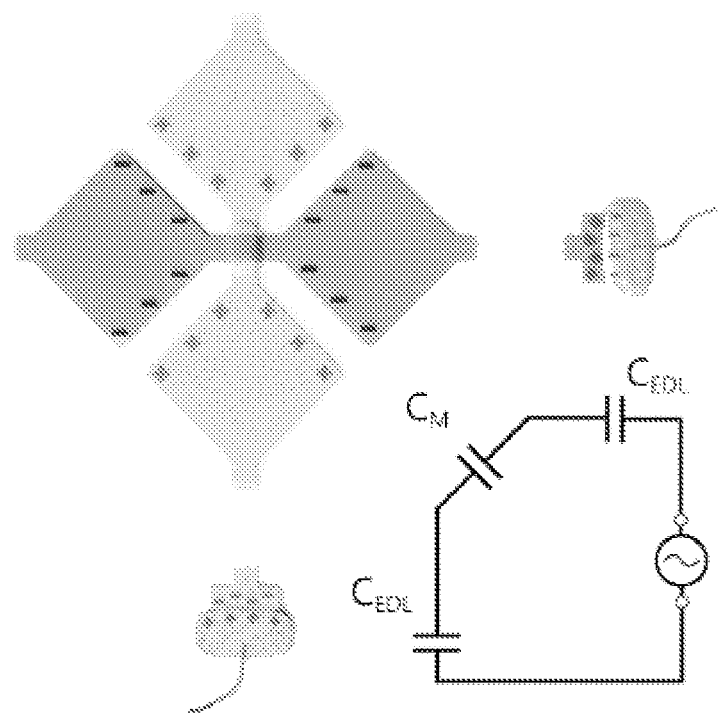
FIG. 3C shows two electrical double layers (EDL) and the $C_m$ are in series when one sensing pixel is activated.
Figure 3D:
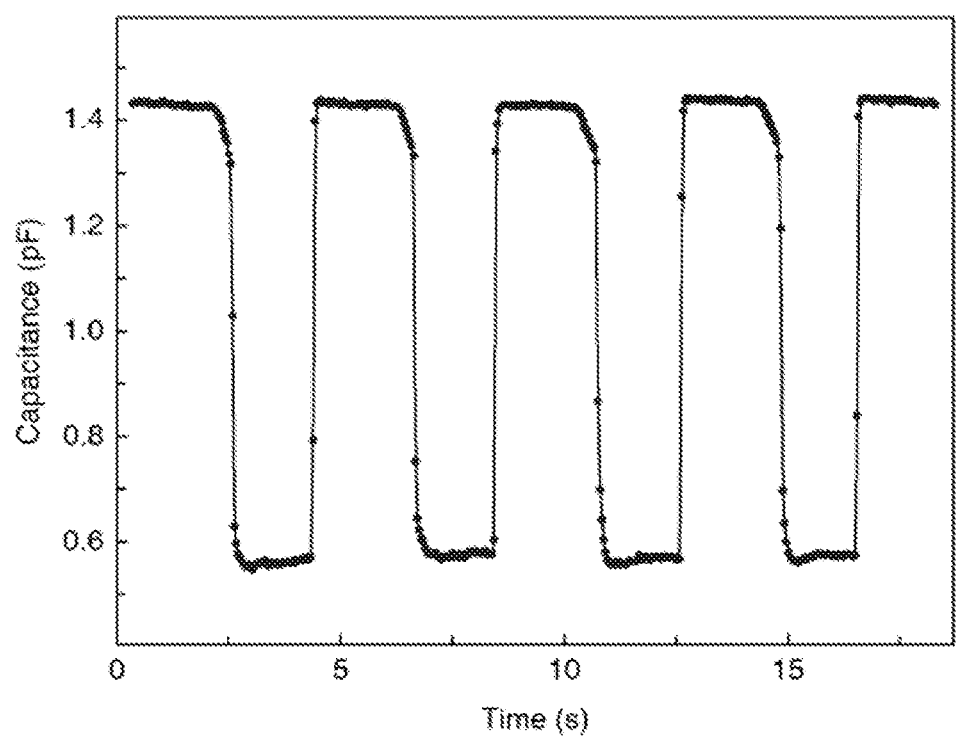
FIG. 3D shows the $C_m$ value change upon repeated finger touch.
Figure 3E:
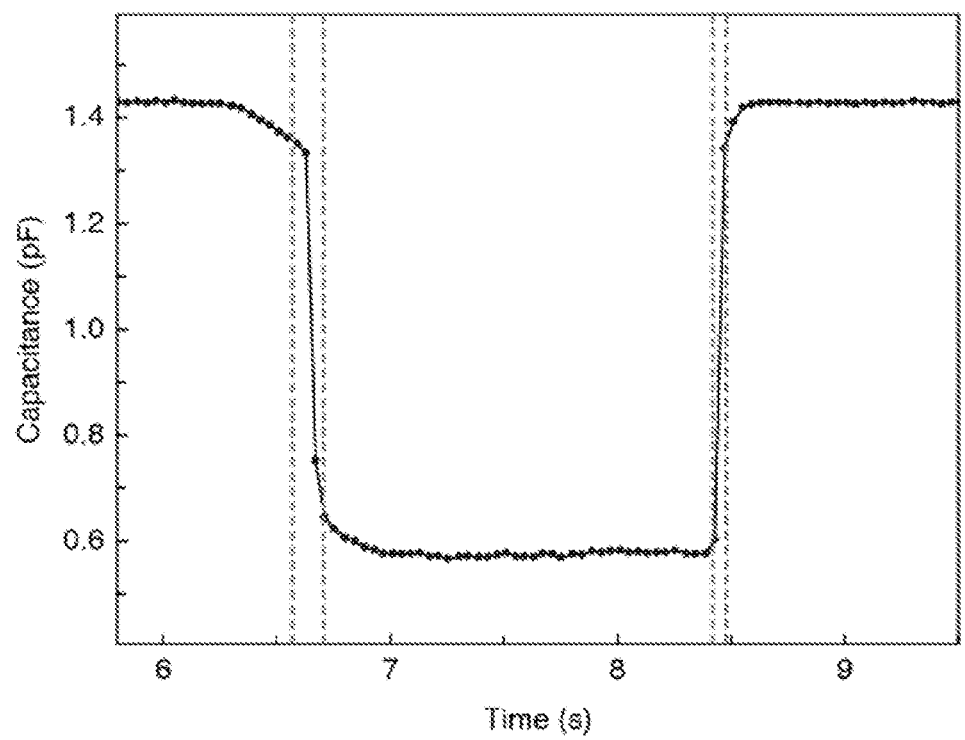
FIG. 3E is the response time characterization of the touch sensor device. Response time is defined herein as the time interval between 10% and 90% of the steady state values, and the time interval between two data points is 42 ms. The interval between each pair of dotted lines represents the response time. During characterization, an approaching finger toward the sensor takes a longer time than a finger leaving the sensor surface, therefore the touch response time arising from the approaching finger is relatively longer than the response time for a finger withdrawing from the sensor surface.

When one x-axis and one y-axis electrode are connected into a measuring circuit, the electrical double layers (EDL) generated at the electronic conductor/ionic conductive gel interface behave like capacitors. In consequence, three capacitors, including two $C_{EDL}$ and the mutual capacitance coupled between four ionic conductive gel squares ($C_m$), are in series connection (FIG. 3C). Since charges in the electronic conductor and ionic conductive gel are separated by mere nanometers, the capacitance of EDL is much larger compared to the mutual capacitance, with $C_{EDL}/C_m \approx 10^5$. According to $1/C = 2/C_{EDL} + 1/C_m$, it may be concluded that the capacitance value measured by a read out circuit is almost the same as $C_m$, and value change in $C_m$ can be recorded accurately. FIG. 3D shows the $C_m$ response to a periodical gentle finger touch with finger pad. $C_m$ decreased from a 1.43 pF baseline value to 0.57 pF, indicating an ultrahigh touch sensitivity of about 60.5%, which is much higher than reported flexible or stretchable touch sensor devices. This ultra-sensitive phenomenon arises from a synergistic effect between the coplanar layout and the thin encapsulation layer, wherein a fringing field is more likely to be projected outwards (i.e. out of plane) and a nearby finger has higher chance to distort electric field lines. In addition, the characterized response time of the present touch sensor device is about 40 ms (FIG. 3E), which is comparable to conventional ITO based p-cap touch sensor devices.

Figure 4A:
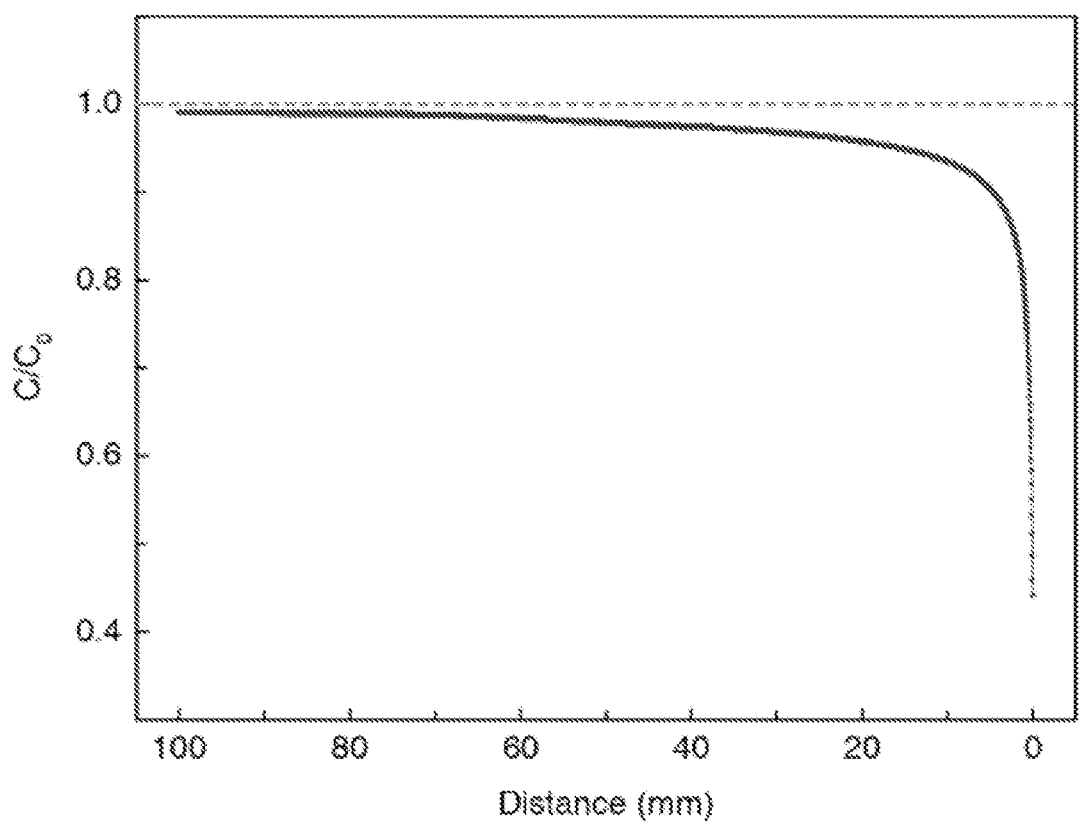
FIG. 4A is a characterization of the touch sensor device's long-range proximity sensibility. The touch sensor device may be a touch sensor panel.
Figure 4B:
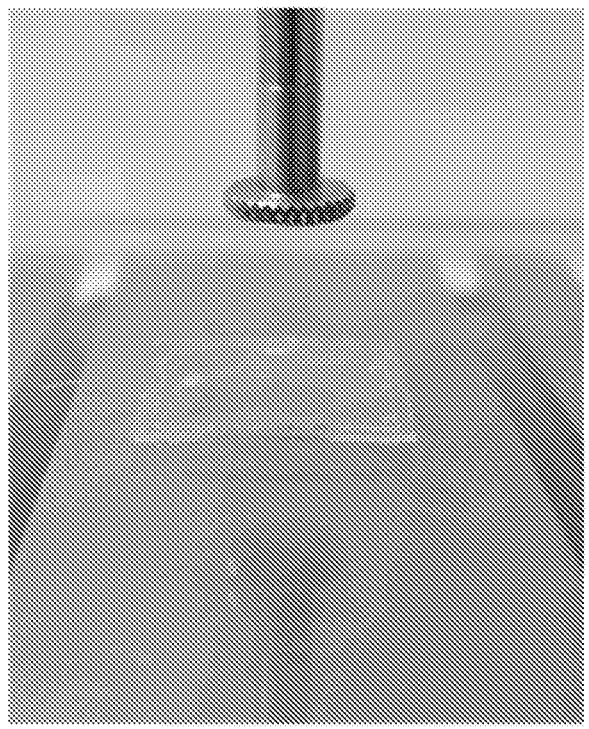
FIG. 4B is a photo showing the proximity mode.
Figure 4C:
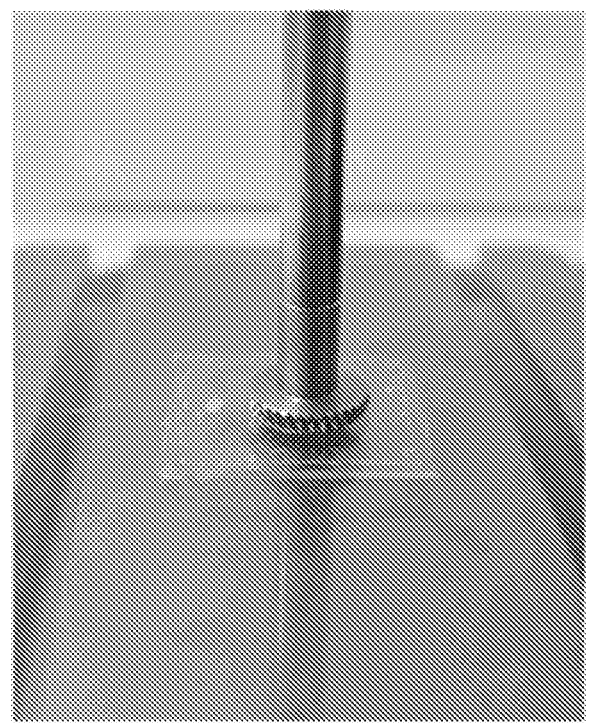
FIG. 4C is a photo showing the pressing mode.
Figure 4D:
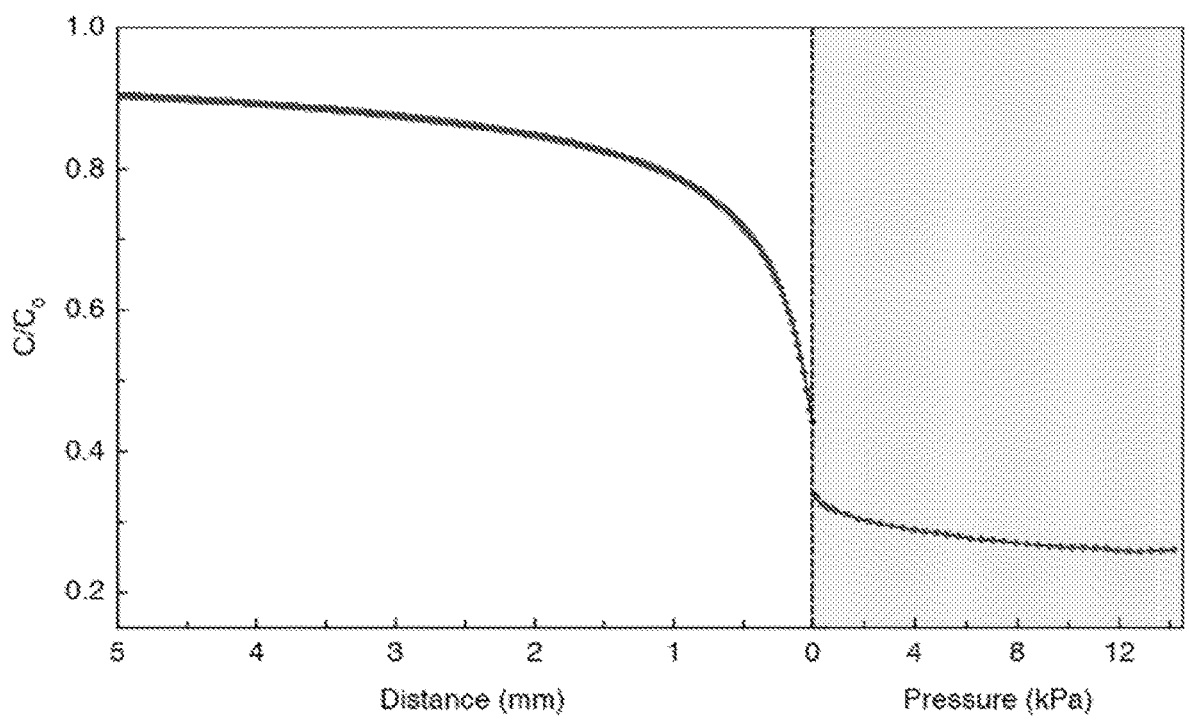
FIG. 4D shows that the $C_m$ decrease in a continuous process from proximity mode to pressing mode.
Figure 4E:
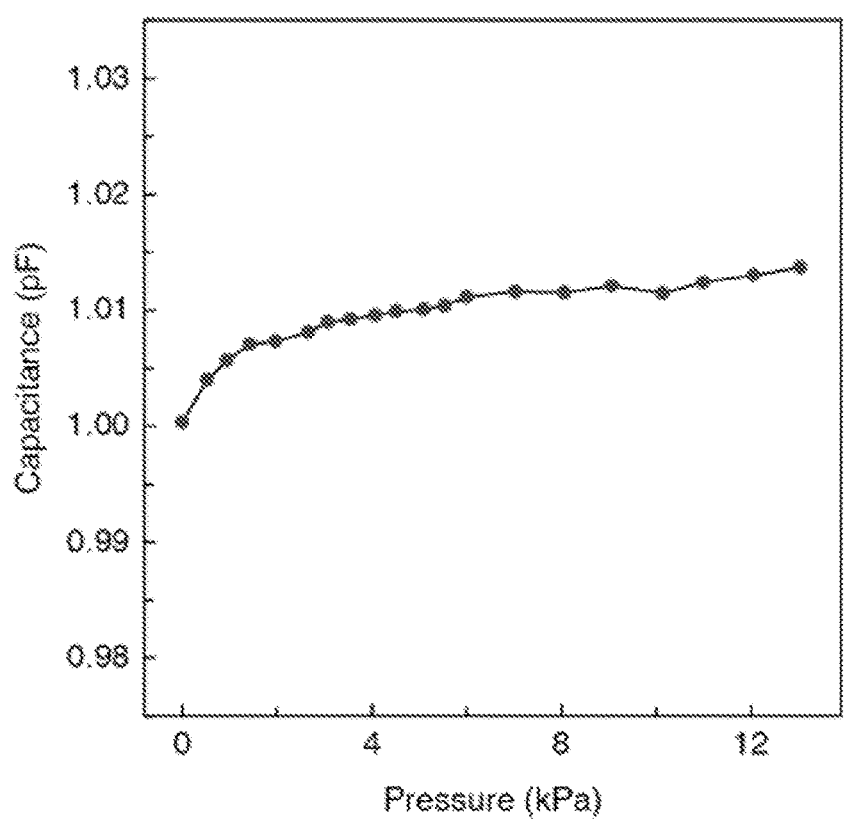
FIG. 4E demonstrates the pure pressure induced $C_m$ increase.

Example 3: Demonstration of Sensing Mode and Response of Present Touch Sensor Device Contactless touch mode, also termed herein as "proximity sensing mode" or "proximity mode" (FIG. 4B), is achieved by the present iontronic based touch sensor device. As disclosed herein, a grounded metal stylus with a circle-plate head was used to simulate the effect of a nearby finger. The stylus was fixed right above a sensing pixel and went all the way down to the sensor device's surface. As seen in FIG. 4A, the sensor device showed a long-range proximity sensing capability, wherein a 1% $C_m$ decrease was perceivable when the stylus head was 100 mm away from the sensor device's surface. At a 5 mm distance, the $C_m$ change was around 10%, then proximity sensing (i.e. C/Co) went into a high slope region as the gap got further smaller. Finally, the stylus head reached the sensor device's surface, and a continuance of pushing the stylus down simulated a real situation where one is not only gently touching but also pressing the sensor device with finger (FIG. 4C). The other end of the stylus was connected to a pressure gauge to record the vertical force during the pressing mode. As observed in FIG. 4D, $C_m$ continued to drop with applied force because the stylus head became even closer to the ionic electrodes of the sensor device, and the p-cap mechanism exerted stronger influence. When a dielectric glass column was used to exert pressure on the sensor device, a 10 kPa pressure led to 1.3% of $C_m$ increase due to the expanded electrodes area (FIG. 4E). This increase, however, can be easily compensated by over 60% $C_m$ decrease if the pressing object is conductive and grounded.

Figure 5A:
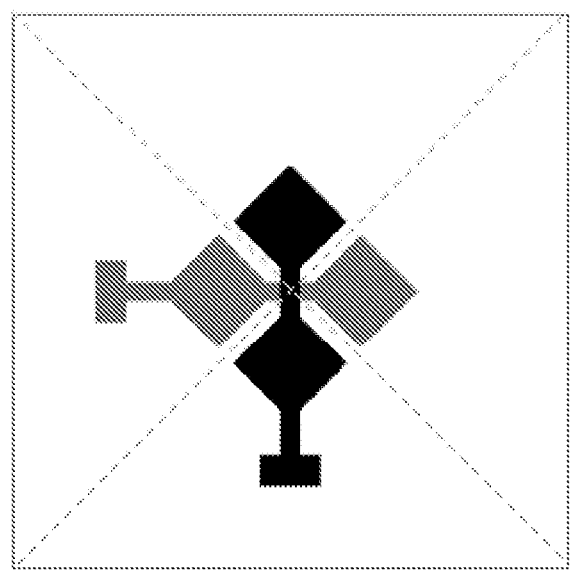
FIG. 5A depicts a structure of the present simplified single-pixel touch sensor device. The touch sensor device may be a touch sensor panel.
Figure 5B:
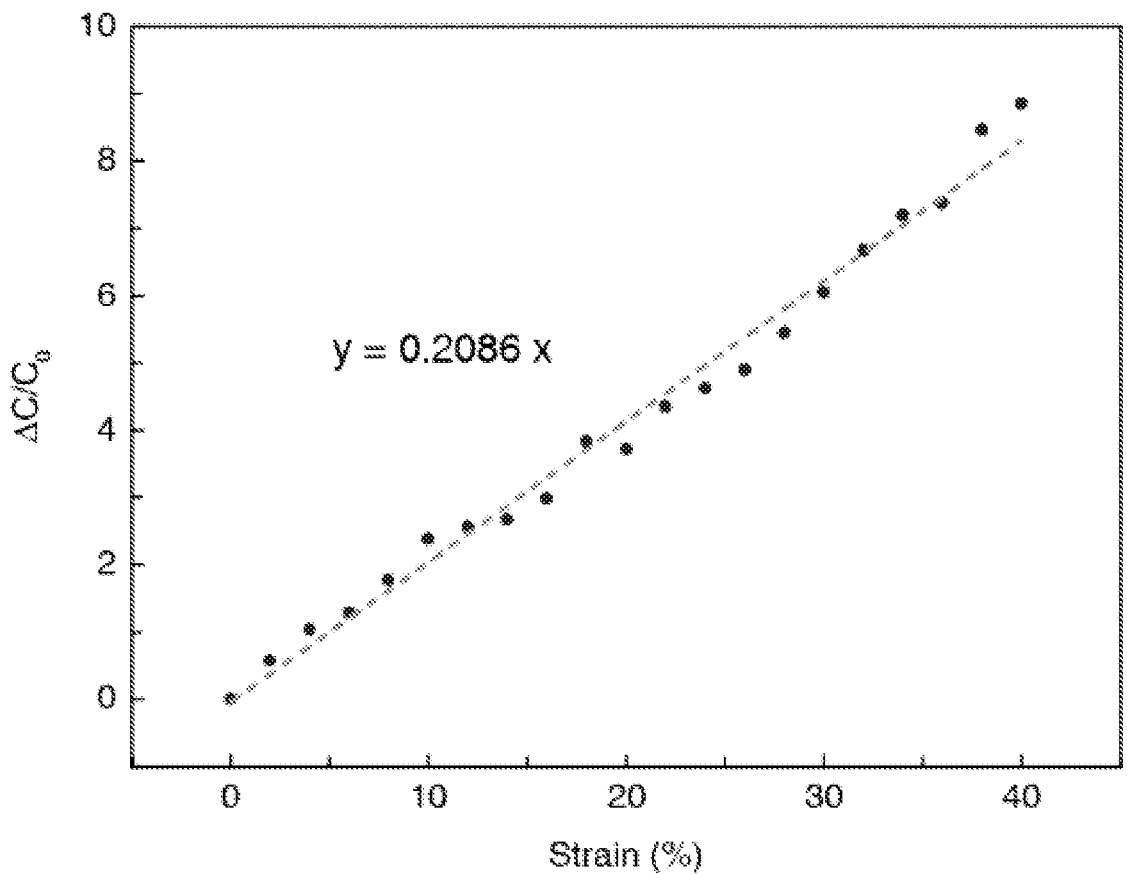
FIG. 5B shows a linear fitting to calculate the touch sensor device's gauge factor upon a large degree of strain.
Figure 5C:
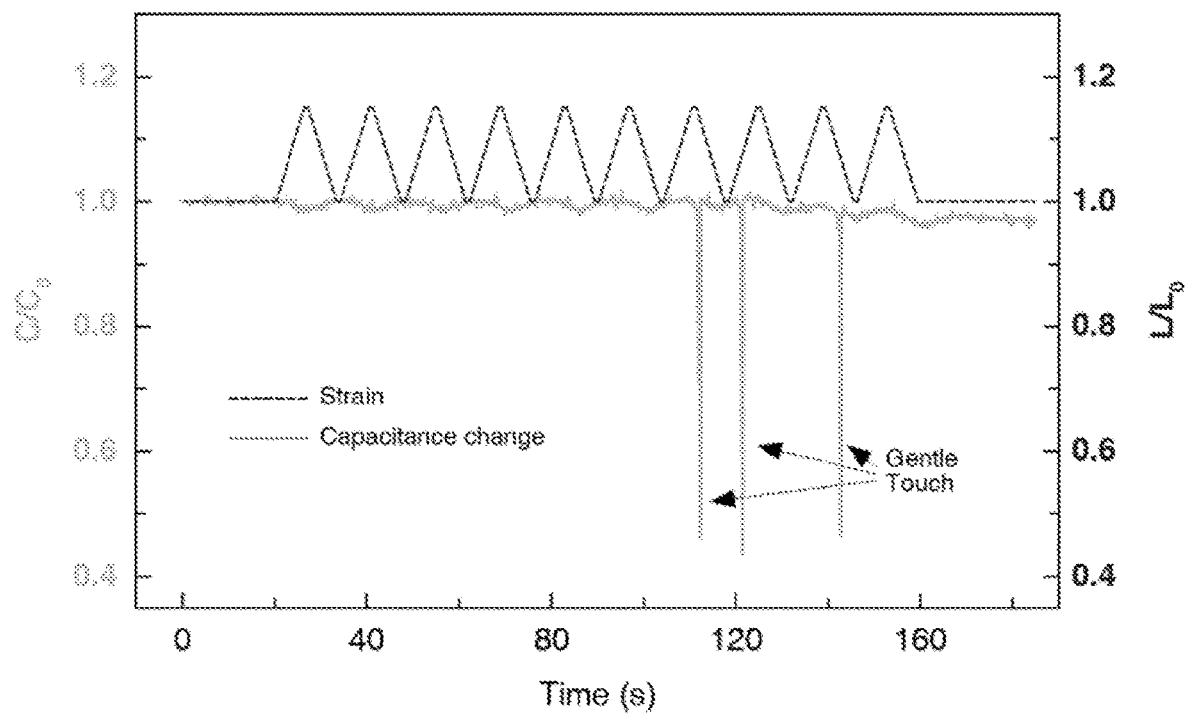
FIG. 5C shows a sensitivity test result upon dynamic stretching of the present touch sensor device.

Example 4: Performance of Present Touch Sensor Device Under Static and Dynamic Contortion To comprehensively investigate a touch sensor device's touch sensing performance under a large extent of stretching, a simplified single-pixel touch sensor device was fabricated following the same fabrication method as described above and herein (FIG. 5A). The touch sensor device was clamped in a dynamic mechanical analyzer and uniaxially stretched along a diagonal direction up to 40% strain. The electrode that was statically stretched had an induced increase in capacitance, but the gauge factor of the present touch sensor device ended up to be about 0.21 (FIG. 5B), which was much lower than that of touch sensor devices with parallel plate configuration (mostly >0.5). To analyze the touch sensor device's sensitivity under dynamic stretch conditions, a periodical triangle wave stretch with 15% strain (4.2 mm amplitude) was applied. As shown in FIG. 5C, the capacitance value fluctuated in consistent with the stretching motion, whereas the extent of capacitance change was much lower than that of strain. Gentle touches were exerted upon the sensor at 92 s, 121 s and 142 s, and the capacitance decrement signal could be clearly recognized. The experimental results unambiguously proved that the present iontronic touch sensor device has stable and reliable touch sensing performance under both static and dynamic stretch conditions.

Example 5: Real-Time Mapping and Detection Using Present Touch Sensor Panel

Figure 6A:
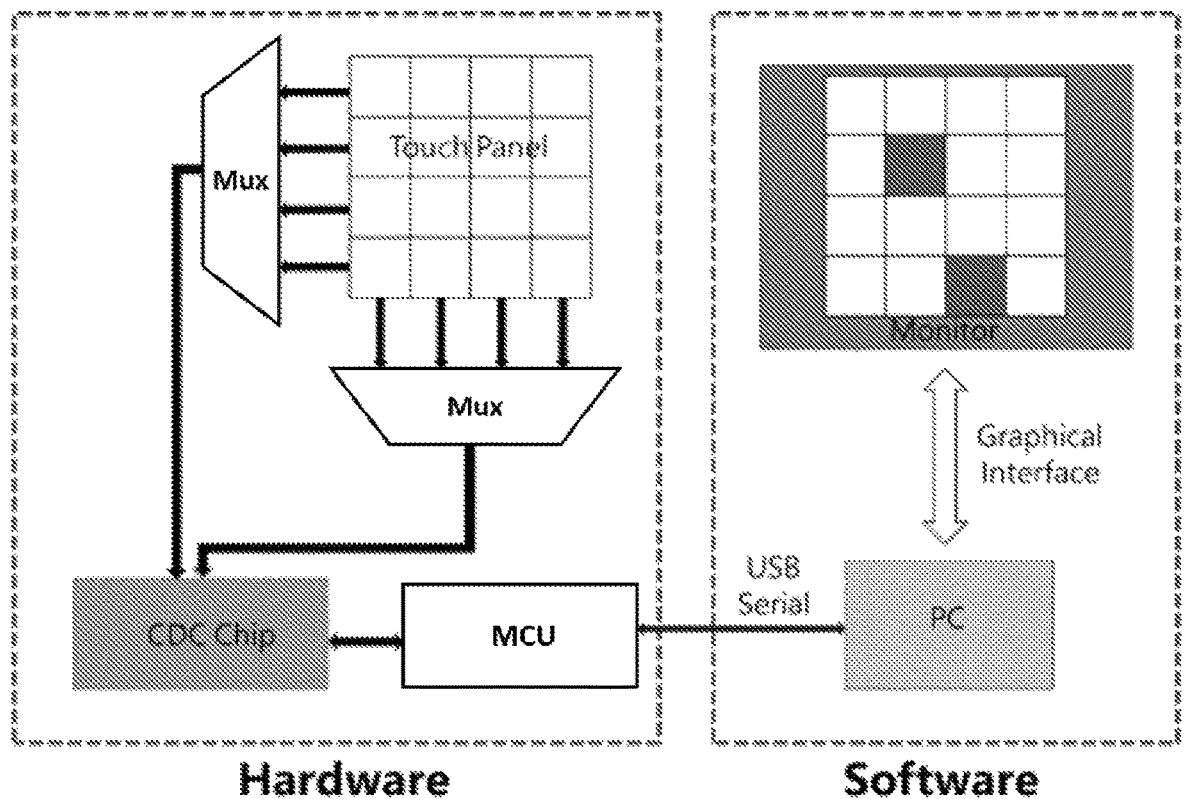
FIG. 6A is a diagram of the readout circuitry that facilitates the communication between the stretchable touch sensor panel and a computer.
Figure 6B:
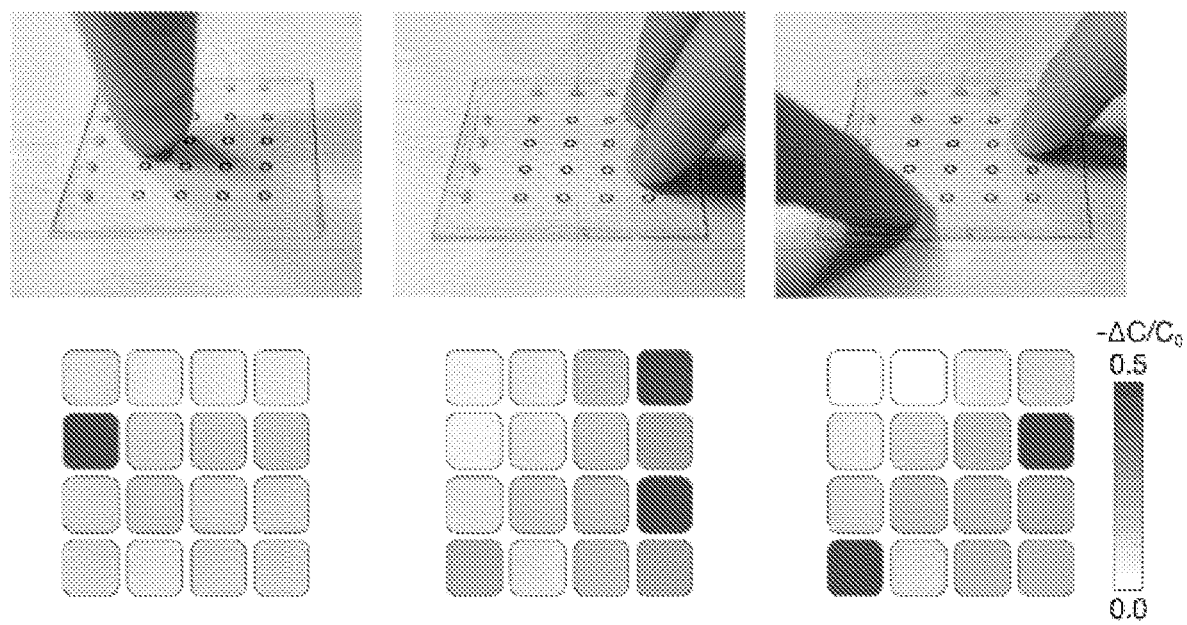
FIG. 6B shows photos of single touch and multi-touch inputs (top images), and the corresponding capacitance change mappings (bottom images).
Figure 6C:
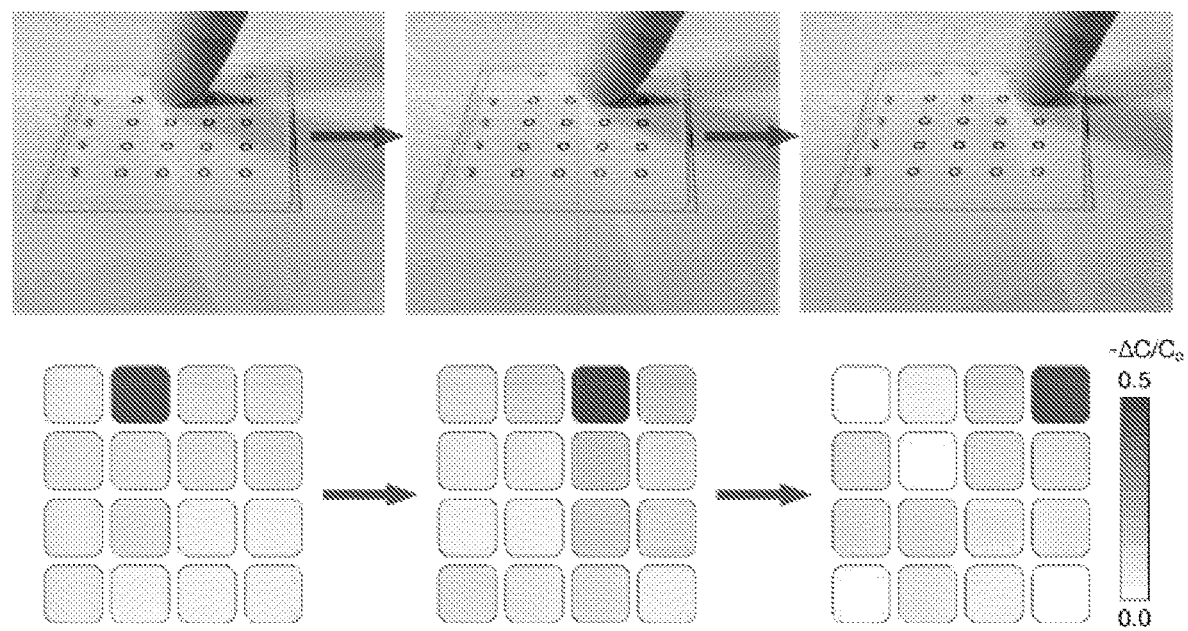
FIG. 6C shows the detection of a finger translating across the touch sensor panel from left to right.
Figure 6D:
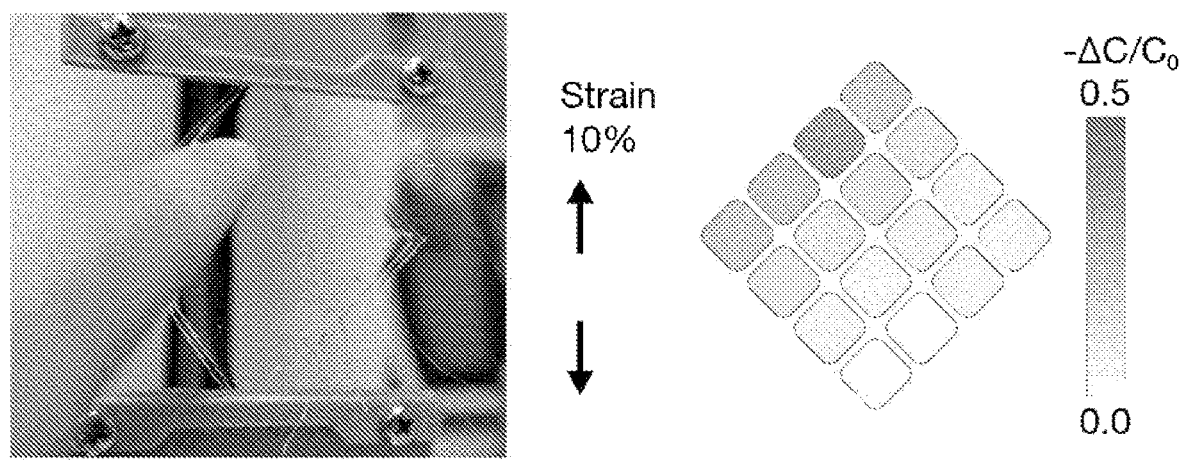
FIG. 6D shows detection of touch under dynamic stretching.
Figure 6E:
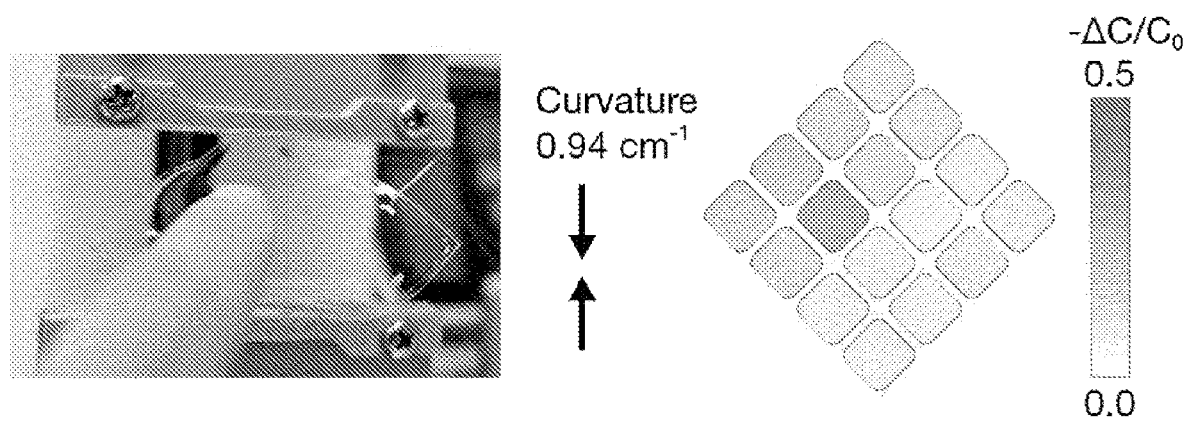
FIG. 6E shows detection of touch under dynamic bending.

Real-time mapping of finger locations on the present stretchable touch sensor panel can be achieved when a customized external circuitry was incorporated. The circuitry design as illustrated in FIG. 6A contains both a signal communicating and processing hardware group as well as a graphical user interface (GUI, software). In this layout, two multiplexers (Mux) are utilized to drive the 16 pixels in cycles, and the detected capacitance values are converted to digital signals through the CDC chip. The microcontroller controls the above-mentioned electronic components and transmits acquired data into a computer where a mapping of the capacitance change can be plotted and finally presented through the GUI. Ascribing to the p-cap sensing mechanism, the present stretchable touch sensor panel can detect not only single touch input but also multiple touch coordinates simultaneously (FIG. 6B). Apart from multi-touch sensing capability, it can also detect other gestures such as finger swipe, which is a common human-machine interaction in consumer electronics. As shown in FIG. 6C, the translation of finger tip from (1,2) to (1,4) was clearly captured. Since the distortion of projected fringing field requires no pressure, there is no need to press firmly when swiping, which minimizes friction between skin and soft PDMS, rendering the interaction much smoother. Recognition of complex gestures is feasible if the panel is scaled up to include more sensing pixels. Performance of the present touch panel under dynamic deformations was investigated. FIG. 6D captures the moment when the touch panel was uniaxially stretched with 10% strain. As discussed above, capacitance change induced by 10% strain is below 2%, therefore it can be easily filtered by the signal stabilizing program. In this case, the location of finger touch was easily recognized. Similarly, dynamic bending does not compromise accuracy of the touch mapping (FIG. 6E). The panel was folded from its original flat state to a flexed state with an approximately 1 $cm^{-1}$ curvature, and a mapping of the resulting capacitance change where the panel was touched was plotted. The immunity to bending is obvious since the ionic electrodes are within 200 µm from neutral axis, and only 2% strain in electrode layer is generated upon 1 cm$^{-1}$ curvature bending.

Example 6: Scalability, Stability, Durability and Performance of Present Touch Sensor Panel The scaling up potential of iontronic touch sensor panels has been discussed above from the perspective of a device's design. The 4×4 array have been demonstrated and there is no constraint to its size. As for the fabrication method, inkjet printing is an example of the manufacturing technique used herein, and industrial-level inkjet printers for mass production could be utilized for the present touch sensor panel. The mass producing inkjet printers play a role not only in traditional solid electronics like PCB solder masking and semiconductor packaging, but also in flexible printed electronics, etc. In other words, the present touch sensor panel and method of producing the touch sensor panel, are versatile in that inkjet printing technology can be utilized without the need to develop any sophisticated modification or re-design. The present ionic conductive ink used for producing the present touch sensor panel is compatible and convenient for producing such touch sensor panel, as it is inkjet printable. This advantageously allows for great printing speed that can facilitate fabrication of stretchable touch sensor panels with much larger area and more sensing pixels.

The yield of the present printed ionic conductor gel may be determined by both ink quality and patterning method. The present ionic conductive ink is an uniform solution with good chemical stability and a long shelf-life. Industrial-level inkjet printers can provide precise material deposition to prevent unwanted intercross between printed electrodes. In principle, the dielectric separators at intersections can be coated based on 3D printing. On this basis, the entire touch sensor panel fabrication process can be machinery controlled with reduced processing error.

The present touch sensor panel is also durable and better in performance over a long period. It has been observed that 3 months after fabrication, the touch sensor panel continues to provide a high accuracy of touch sensing functionality with little data offset.

Example 7: Manufacturing Cost, and Commercial and Potential Applications

The proposed touch sensor panel is mostly polymer based, wherein PDMS constitutes the elastomer matrix while PVA is used for the ionic conductive gel. Using inkjet printing technology additionally saves on conductor materials and further reduces the cost of raw materials. Based on the examples demonstrated herein, the raw material costing can be limited to within $3 per square meter.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An inkjet printable ionic conductive ink for producing a touch sensor device, wherein the inkjet printable ionic conductive ink comprises:
   a hydrophilic polymer and an ionic salt;
   a mixture of solvents, comprising an aqueous solvent and an organic solvent having a higher boiling point than the aqueous solvent, in which the hydrophilic polymer and the ionic salt are dissolved therein to form a solution, wherein the hydrophilic polymer is present in an amount of less than 10 wt % in the mixture of solvents; and
   a surfactant to render the solution inkjet printable.

2. The inkjet printable ionic conductive ink of claim 1, wherein the hydrophilic polymer comprises polyvinyl alcohol, polyacrylic acid, polyacrylamide, or polyethylene glycol, wherein the polyvinyl alcohol has a molecular weight ranging from 5000 to 50,000 g/mol.

3. The inkjet printable ionic conductive ink of claim 1, wherein the mixture of solvents comprises water and dimethyl sulfoxide, water and glycerin, water and ethylene glycol, water and diethylene glycol, or water and propylene glycol.

4. The inkjet printable ionic conductive ink of claim 1, wherein the surfactant is a non-ionic polymer comprising a siloxane, a hydrophobically modified cellulose and derivative thereof, an ethoxylated polyacrylate, a novolac resin ethoxylate, or an ethylene oxide-propylene oxide copolymer.

5. A method of producing the inkjet printable ionic conductive ink of claim 1, the method comprising:
   dissolving the hydrophilic polymer and the ionic salt in the mixture of solvents, the mixture of solvents comprising the aqueous solvent and the organic solvent having the higher boiling point than the aqueous solvent, to form the solution; and
   mixing the solution with the surfactant to render the solution inkjet printable.

6. The method of claim 5, wherein the dissolving comprises mixing the hydrophilic polymer with the mixture of solvents in the amount which is less than 10 wt %, wherein the wt % is calculated by dividing weight of the hydrophilic polymer by weight of the inkjet printable ionic conductive ink, and wherein the dissolving comprises mixing a binary mixture of solvents comprising the aqueous solvent and the organic solvent to form the mixture of solvents.

7. The method of claim 5, wherein mixing the solution with the surfactant comprises adding the surfactant in an amount ranging from 0.01 to 0.1 wt % to the solution, wherein the wt % is calculated by dividing weight of the surfactant by weight of the inkjet printable ionic conductive ink.

8. A flexible touch sensor panel comprising:
   one or more rows of structures formed from the inkjet printable ionic conductive ink of claim 1, wherein adjacent structures in each row are spaced apart and connected by a first ionic bridge;
   one or more columns of structures formed from the inkjet printable ionic conductive ink of claim 1, wherein adjacent structures in each column are spaced apart and connected by a second ionic bridge;
   each of the one or more columns of structures are arranged substantially orthogonal to each of the one or more rows of structures to have each structure in the one or more columns spaced apart from each structure in the one or more rows, wherein the first ionic bridge is separated from the second ionic bridge by a dielectric material, and wherein the first ionic bridge vertically overlaps the second ionic bridge.

9. The flexible touch sensor panel of claim 8, wherein the one or more rows of structures and the one or more columns of structures are arranged to be coplanar.

10. The flexible touch sensor panel of claim 8, wherein the one or more rows of structures and the one or more columns of structures are arranged on a flexible substrate, wherein the flexible substrate which the one or more rows of structures and the one or more columns of structures are arranged thereon is the same flexible substrate.

11. The flexible touch sensor panel of claim 8, wherein the first ionic bridge and the second ionic bridge are formed of the inkjet printable ionic conductive ink of claim 1.

12. The flexible touch sensor panel of claim 8, wherein each structure of the one or more rows of structures and of the one or more columns of structures has a quadrilateral cross-section.

13. The flexible touch sensor panel of claim 8, wherein the dielectric material comprises polydimethylsiloxane, silicone, acrylic, or polyurethane, wherein the flexible substrate is an elastomer comprising polydimethylsiloxane, silicone, acrylic, or polyurethane.

14. The flexible touch sensor panel of claim 8, further comprising an encapsulating layer which encapsulates the one or more rows of structures, the one or more columns of structures, and the dielectric material.

15. The flexible touch sensor panel of claim 14, wherein the dielectric material, the flexible substrate, and the encapsulating layer each comprises an elastomeric material having substantially similar elastic modulus ranging from 0.5 to 5 MPa.

16. A method of producing the flexible touch sensor panel of claim 8, the method comprising:
    depositing the inkjet printable ionic conductive ink of claim 1 to form the one or more rows of structures on a flexible substrate, wherein the adjacent structures in each row are spaced apart and connected by the first ionic bridge;
    coating the dielectric material on the first ionic bridge; and
    depositing the inkjet printable ionic conductive ink of claim 1 to form one or more columns of structures on the flexible substrate, wherein adjacent structures in each column are spaced apart and connected by the second ionic bridge,
    wherein each of the one or more columns of structures are deposited substantially orthogonal to each of the one or more rows of structures to have each structure in the one or more columns spaced apart from each structure in the one or more rows, wherein the first ionic bridge is separated from the second ionic bridge by the dielectric material, and wherein the first ionic bridge vertically overlaps the second ionic bridge.

17. The method of claim 16, wherein depositing the inkjet printable ionic conductive ink to form the one or more rows of structures and the one or more columns of structures comprises arranging the one or more rows of structures and the one or more columns of structures to be coplanar.

18. The method of claim 16, wherein depositing the inkjet printable ionic conductive ink to form the one or more rows of structures and the one or more columns of structures comprises forming each structure of the one or more rows of structures and of the one or more columns of structures to have a quadrilateral cross-section.

19. The method of claim 16, further comprising encapsulating the one or more rows of structures, the one or more columns of structures, and the dielectric material, with an encapsulating layer.

20. The inkjet printable ionic conductive ink of claim 1, wherein the ionic salt is present in an amount ranging from 1 wt % to 10 wt % in the mixture of solvents.

* * * * *

UNITED STATES PATENT AND TRADEMARK OFFICE
CERTIFICATE OF CORRECTION

PATENT NO. : 11,634,603 B2
APPLICATION NO. : 17/263964
DATED : April 25, 2023
INVENTOR(S) : Dace Gao et al.

It is certified that error appears in the above-identified patent and that said Letters Patent is hereby corrected as shown below:

In the Claims

In Column 22, Line 4, Claim 16, delete "to form one" and insert -- to form the one --, therefor.

In Column 22, Line 5, Claim 16, delete "wherein adjacent" and insert -- wherein the adjacent --, therefor.

Signed and Sealed this
Fifth Day of December, 2023

Katherine Kelly Vidal
*Director of the United States Patent and Trademark Office*